US010877343B2

United States Patent
Yoshida

(10) Patent No.: US 10,877,343 B2
(45) Date of Patent: Dec. 29, 2020

(54) ARRAY SUBSTRATE AND DISPLAY DEVICE

(71) Applicant: Sharp Kabushiki Kaisha, Sakai (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/686,295

(22) Filed: Nov. 18, 2019

(65) Prior Publication Data

US 2020/0159079 A1    May 21, 2020

Related U.S. Application Data

(60) Provisional application No. 62/770,209, filed on Nov. 21, 2018.

(51) Int. Cl.
*G02F 1/1362* (2006.01)
*G02F 1/1343* (2006.01)
*G02F 1/1368* (2006.01)

(52) U.S. Cl.
CPC ...... *G02F 1/136286* (2013.01); *G02F 1/1368* (2013.01); *G02F 1/134336* (2013.01); *G02F 2001/134354* (2013.01); *G02F 2201/123* (2013.01)

(58) Field of Classification Search
CPC ......... G02F 1/136286; G02F 1/134336; G02F 1/1368; G02F 2201/123; G02F 2001/134354
USPC .................................................. 349/38, 139
See application file for complete search history.

(56) References Cited

U.S. PATENT DOCUMENTS

| | | | | |
|---|---|---|---|---|
| 2008/0136990 | A1* | 6/2008 | Kimura | H01L 27/1218 349/46 |
| 2013/0083263 | A1* | 4/2013 | Kim | G02F 1/13624 349/38 |
| 2018/0107040 | A1* | 4/2018 | Yeh | G02F 1/136213 |

FOREIGN PATENT DOCUMENTS

JP        10-142578 A        5/1998

* cited by examiner

*Primary Examiner* — Charles S Chang
(74) *Attorney, Agent, or Firm* — Keating & Bennett, LLP

(57) ABSTRACT

An array substrate includes electrodes, capacitance forming portions, a first capacitance line, and a second capacitance line. The electrodes are arranged in a first direction and a second direction crossing the first direction. The capacitance forming portions are arranged in the first direction and the second direction to overlap the electrodes via an insulator. The first capacitance line includes a section of a conductive film including sections configured as the capacitance forming portions and extends in the first direction. The first capacitance line is coupled to the capacitance forming portions adjacent to each other in the first direction, respectively. The second capacitance line includes a section of the conductive film including sections configured as the capacitance forming portions and extends in the second direction. The second capacitance line is coupled to the capacitance forming portions adjacent to each other in the second direction, respectively.

17 Claims, 18 Drawing Sheets

ARRAY SUBSTRATE AND DISPLAY DEVICE

CROSS REFERENCE TO RELATED APPLICATION

This application claims priority from Provisional Patent Application No. 62/770,209 filed on Nov. 21, 2018. The entire contents of the priority application are incorporated herein by reference.

TECHNICAL FIELD

The technology described herein relates to an array substrate and a display device.

BACKGROUND ART

An example of a liquid crystal display device is described in Japanese Unexamined Patent Application Publication No. H10-142578. Data lines Dj−2, Dj, . . . in the liquid crystal display device are disposed such that each of the data lines Dj−2, Dj, . . . is disposed between every two lines of pixels in a grid of pixels PX (I, j)(i=1−m, j=1−n). The data lines Dj-2, Dj, . . . transmit signal voltages to the pixels. One first gate line GAi and one second gate line GBi are provided for each row of the grid of the pixels. The i-th row includes n pixels. The first gate line GAi is for supplying gate voltages to n/2 of the pixels to which the signal voltages are supplied via n/2 of the data lines. The second gate line GBi is for supplying gate voltages to n/2 of the pixels in the i-th row other than the pixels to which the gate voltages are supplied through the gate line GAi.

In the liquid crystal display device, the smaller number of data lines is required for driving the pixels in comparison to the conventional technology. Cs lines (storage capacitance lines) are disposed parallel to the data lines in borders between pixels in which the data lines are not disposed. The Cs lines linearly extend simply parallel to the data lines. If a size of the liquid crystal display device is increased, standard deviation in distribution regarding resistances of the Cs lines may increase. Therefore, potentials at the pixels are not stable resulting in display defects such as shadowing.

SUMMARY

The technology described herein was made in view of the above circumstances. An object is to stably hold potentials at electrodes.

An array substrate includes electrodes, capacitance forming portions, a first capacitance line, and a second capacitance line. The electrodes are arranged in a first direction and a second direction that crosses the first direction. The capacitance forming portions are arranged in the first direction and the second direction to overlap the electrodes via an insulator. The first capacitance line includes a section of a conductive film including sections configured as the capacitance forming portions. The first capacitance line extends in the first direction. The first capacitance line is coupled to the capacitance forming portions adjacent to each other in the first direction, respectively. The second capacitance line includes a section of the conductive film including sections configured as the capacitance forming portions. The second capacitance line extends in the second direction. The second capacitance line is coupled to the capacitance forming portions adjacent to each other in the second direction, respectively.

A display device that includes the array substrate described above and an opposed substrate opposed to the array substrate.

According to the technology described herein, potentials at electrodes can be stably held.

DETAILED DESCRIPTION

First Embodiment

Figure 1:
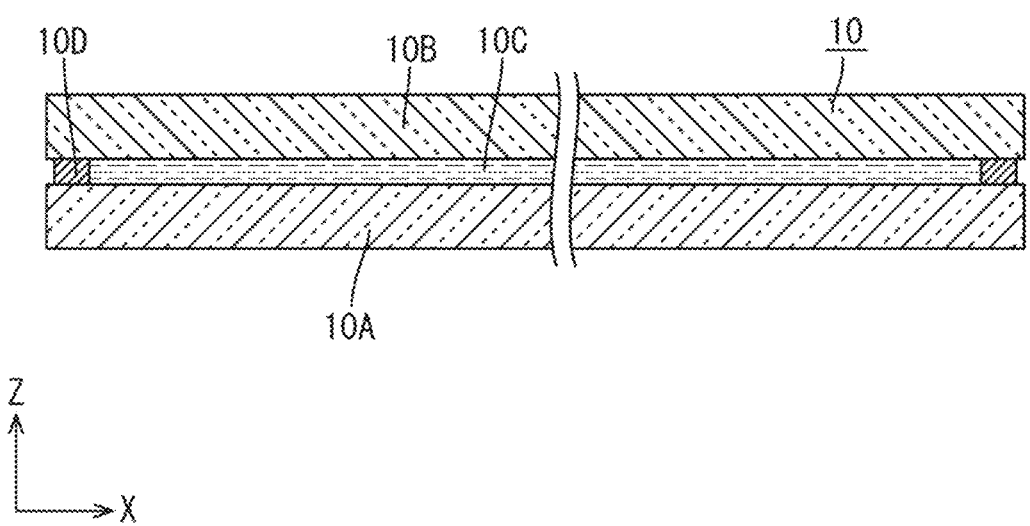
FIG. 1 is a cross-sectional view of a liquid crystal panel according to a first embodiment.

A first embodiment will be described in detail with reference to FIGS. 1 to 8. In this section, an array substrate 10A included in a liquid crystal panel 10 (a display panel) will be described. In the drawings, X-axes, Y-axes, and Z-axes may be present. The axes in each drawing correspond to the respective axes in other drawings. Upper sides and lower sides of FIGS. 4, 7 and 8 correspond to the front side and the rear side of the liquid crystal panel 10.

FIG. 1 is a cross-sectional view schematically illustrating the liquid crystal panel 10. As illustrated in FIG. 1, the liquid crystal panel 10 includes the array substrate 10A, a CF substrate 10B (an opposed substrate), a liquid crystal layer 10C, and a sealant 10D. The CF substrate 10B is opposed to the array substrate 10A. The liquid crystal layer 10C is disposed between the substrates 10A and 10B. The sealant 10D surrounds the liquid crystal layer 10C and seals the liquid crystal layer 10C. In this embodiment, a liquid crystal material included in the liquid crystal layer 10C is a negative liquid crystal material having negative dielectric constant anisotropy. Polarizing plates are bonded to outer surfaces of the substrates 10A and 10B, respectively. The liquid crystal panel 10 according to this embodiment may have a screen size of about 60 inches (e.g., 62.4 inches) or about 30 inches (e.g., 31.2 inches) with a resolution of "7680×4320" corresponding to an 8K resolution or a resolution of "3840×2160" corresponding to a 4K resolution.

Figure 2:
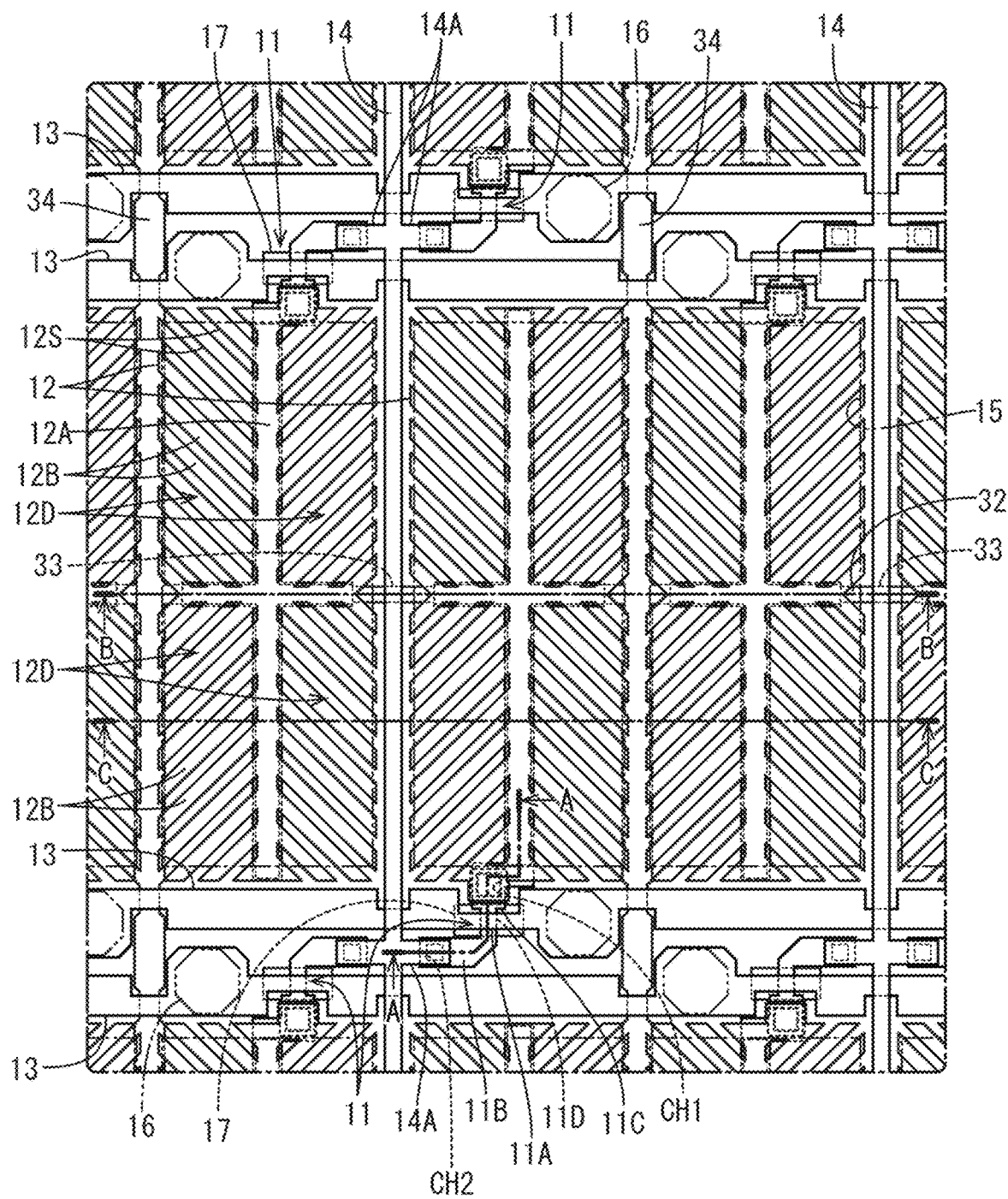
FIG. 2 is a plan view illustrating arrangement of pixels in an array substrate included in the liquid crystal panel.

The liquid crystal panel 10 includes a display area in which images can be displayed and a non-display area surrounding the display area. FIG. 2 is a plan view illustrating a section of the array substrate 10A in the display area. FIG. 2 includes a section of the CF substrate 10B. As illustrated in FIG. 2, TFTs 11 (switching components, thin film transistors) are arranged in a matrix. Furthermore, pixel electrodes 12 (electrodes) connected to the TFTs 11 are arranged along the X-axis direction (a first direction) and a Y-axis direction (a second direction) in a matrix. Gate lines 13 (first lines, scanning lines) and source lines 14 (second lines, data lines, signal lines) are routed in a grid to surround the TFTs 11 and the pixel electrodes 12. The TFTs 11 include at least gate electrodes 11A, source regions 11B, and drain regions 11C. The gate electrodes 11A are connected to the gate lines 13. The source regions 11B are connected to the source lines 14. The drain regions 11C are connected to the pixel electrodes 12. The TFTs 11 turn on based on scanning signals supplied through the gate lines 13 and image signals (data signals) transmitted through the source lines 14 are supplied to the pixel electrodes 12 to charge the pixel electrodes 12 to potentials based on the image signals.

As illustrated in FIG. 2, the gate lines 13 extend substantially along the X-axis direction and the source lines 14 extend substantially along the Y-axis direction. The lines 13 and 14 are perpendicular to (crossing) each other. The gate lines 13 are disposed such that two gate lines 13 are consecutively arranged every two pixel electrodes 12 that are adjacent to each other in the Y-axis direction. Therefore, the number of the gate lines 13 is double of the number of lines of the pixel electrodes 12 in the Y-axis direction. The source lines 14 are arranged at intervals such that two pixel electrodes 12 are sandwiched between two source lines 14 in the X-axis direction. Therefore, the number of the source lines 14 is a half of the number of lines of the pixel electrodes 12 in the X-axis direction. The TFTs 11 include the TFT 11 that is connected to one of the two adjacent gate lines 13 (e.g., the gate line 13 on the upper side in FIG. 2) and the pixel electrode 12 adjacent to the gate line 13 and the TFT 11 that is connected to the other one of the two adjacent gate lines 13 (e.g., the gate line 13 on the lower side in FIG. 2) and the pixel electrode 12 adjacent to the gate line 13. The TFTs 11 are connected to the same source line 14. The pixel electrode 12 connected to one of the TFTs 11 is adjacent to the source line 14 on a first side with respect to the X-axis direction (e.g., on the right in FIG. 2). The pixel electrode 12 connected to the other one of the TFTs 11 is adjacent to the source line 14 on a second side with respect to the X-axis direction (e.g., on the left in FIG. 2). Namely, each of two TFTs 11 is connected to one source line 14, one of two pixel electrodes 12, and one of two gate lines 13. The two pixel electrodes 12 are disposed diagonally opposite to each other with the source line 14 therebetween. The two gate lines 13 are sandwiched between the two pixel electrodes 12. The TFTs 11 are two-dimensionally arranged in zigzags such that adjacent two TFTs 11 are diagonally opposite to each other with the source line 14 therebetween. According to the configuration, image signals supplied to each of the source lines 14 are supplied to two pixel electrodes 12 that are diagonally opposite to each other with the source line 14 therebetween via two TFTs 11 that are connected to the different gate lines 13. Because scanning signals are supplied to two gate lines 13 that are sandwiched between two electrodes 12 at different timings, the pixel electrodes 12 arranged in the X-axis direction and pixel electrodes 12 arranged in Y-axis direction can be charged to different potentials. In comparison to a configuration in which source lines and pixel electrodes are alternately arranged, the number of the source lines 14 is reduced in half and the number of circuits (or a size of a circuit) for driving the source lines 14 can be reduced. This configuration is preferable for reducing a width of a bezel and a production cost of the liquid crystal panel 10.

As illustrated in FIG. 2, each of the pixel electrodes 12 is disposed in a vertically-long rectangular area. The pixel electrodes 12 include trunk electrode portions 12A and branch electrode portions 12B coupled to the trunk electrode portions 12A. An overall shape of each of the pixel electrodes 12 in a plan view is a fishbone shape. Each trunk electrode portion 12A has a cross shape in the plan view. The trunk electrode portions 12A include sections that extend in the X-axis direction and sections that extend in the Y-axis direction. The branch electrode portions 12B are disposed in four regions divided by the trunk electrode portions 12A having the cross shape. Multiple branch electrode portions 12B are disposed in each region. One of ends of each of the branch electrode portion 12B is coupled to the trunk electrode portion 12A. The branch electrode portions 12B radially spread from the center of the trunk electrode portion 12A. The branch electrode portions 12B disposed in the regions adjacent to one another in the X-axis direction and the Y-axis direction extend in directions that cross each other. The branch electrode portions 12B are arranged at about equal intervals in each region. Slits 12S are provided between the adjacent branch electrode portions 12B. Each slit 12S has a substantially constant width. The slits 12S extend in the directions in which the branch electrode portions 12B extend and radially spread from the center of the trunk electrode portion 12A in each region. Namely, each of the pixel electrodes 12 includes four domains 12D. The direction in which the slits 12S extend in one domain 12D is different from the direction in which the slits 12S extend in other domain 12D. Two domains 12D of each of the pixel electrodes 12 are arranged in the X-axis direction and two domains 12D of the pixel electrode 12 are arranged in the Y-axis direction. The trunk electrode portion 12A of each of the pixel electrodes 12 defines borders of four domains 12D. Each of the domains 12D has a vertically-long rectangular shape in the plan view. Recesses are formed in sections of the surface of the array substrate 10A overlapping the slits 12S (sections in which the pixel electrodes 12 are not disposed). Electric fields are created according to shapes of the recesses and thus the liquid crystal molecules in the liquid crystal layer 10C are oriented along the recesses. The orientations of the liquid crystal molecules in the liquid crystal layer 10C are different from region to region. Namely, the liquid crystal panel 10 according to this embodiment operates in multi-domain vertical alignment (MVA) mode to obtain a wide viewing angle. The CF substrate 10B includes a black matrix 15 (an inter-pixel light blocking portion) including holes in sections overlapping the pixel electrodes 12. The black matrix 15 is disposed to overlap the TFTs 11, the gate lines 13, and the source lines 14. The CF substrate 10B includes spacers 16 for maintaining a thickness of the liquid crystal layer 10C (a cell gap). The spacers 16 are two-dimensionally arranged to overlap sections of the gate lines 13.

Figure 3:
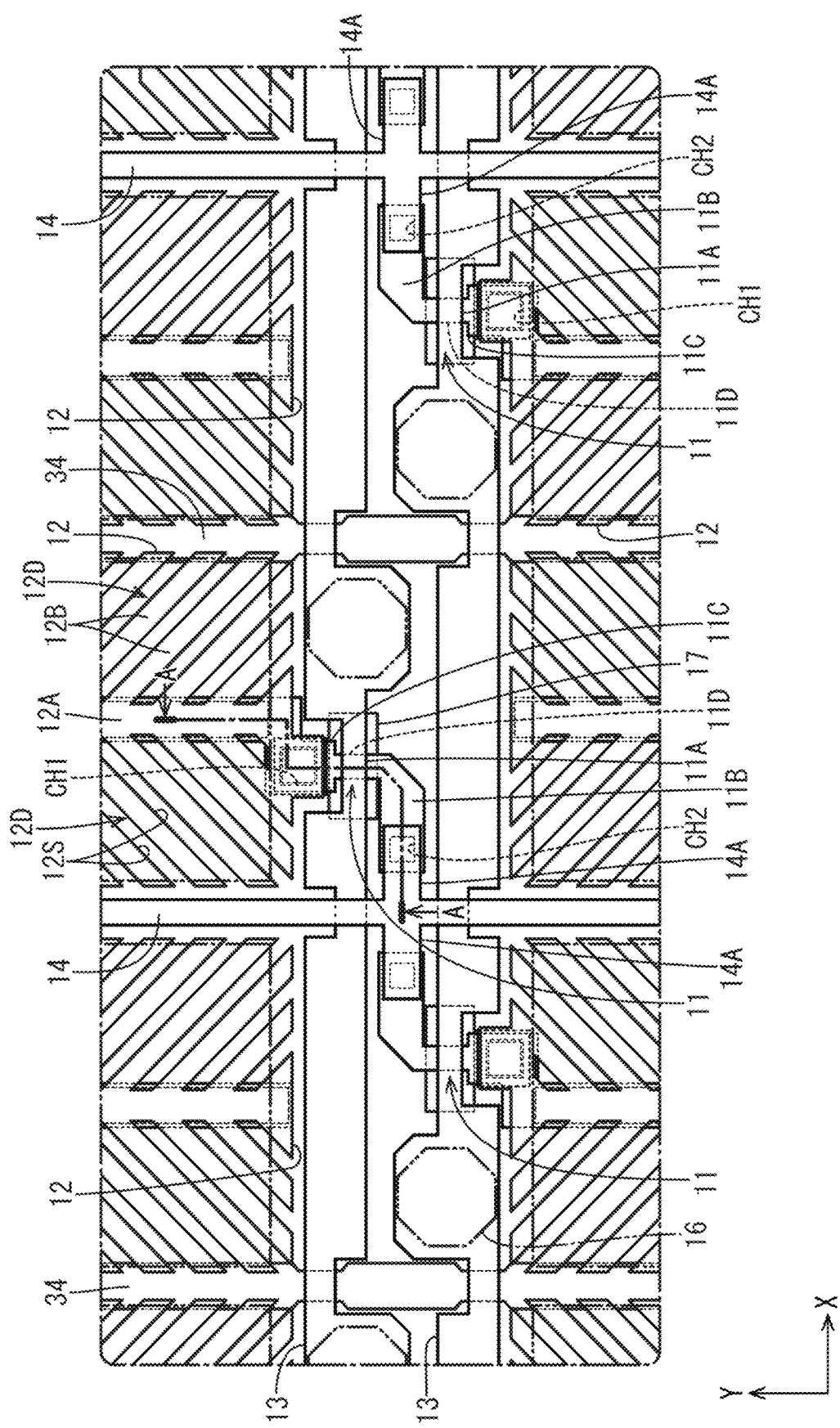
FIG. 3 is a magnified plan view illustrating a portion of the array substrate including a TFT and therearound.

FIG. 3 is a plan view illustrating a portion of the array substrate 10A including the TFT 11 and therearound. The configuration of the TFT 11 will be described in detail with reference to FIG. 3. As illustrated in FIG. 3, each of the TFTs 11 is disposed adjacent to the pixel electrode 12 to which the TFT 11 is connected and below or above the pixel electrode 12 with respect to the Y-axis direction in FIG. 3. The TFTs 11 include the gate electrodes 11A that are sections of the gate lines 13. Each gate line 13 includes sections having widths that are different from each other at positions in the X-axis direction. The width of the sections configured as the gate electrodes 11A (sections crossing channel regions 11D) is the smallest. The TFTs 11 include the source regions 11B connected to the source lines 14. Each source line 14 includes source line branches 14A that branch off from sections of the source line 14 between two consecutive gate lines 13. Two source line branches 14A branch off from each section of the source line 14. The two source line branches 14A that branch off from each section of the source line 14 extend to the right and the left, respectively, along the X-axis direction. Ends of the source line branches 14A are connected to the source regions 11B. The TFTs 11 include the drain regions 11C disposed with distances from the source regions 11B in the Y-axis direction. The drain regions 11C include ends on an opposite side from the source regions 11B (the channel region 11D) connected to the pixel electrodes 12. The TFTs 11 include the channel regions 11D overlapping the gate electrodes 11A and being coupled to the source regions 11B and the drain regions 11C. The channel regions 11D extend in the Y-axis direction. First ends and second ends of the channel regions 11D are connected to the source regions 11B and the drain regions 11C, respectively. When the TFTs 11 turn on based on scanning signals supplied to the gate electrodes 11A, image signals (potentials) supplied to the source lines 14 are transmitted to the drain regions 11C via the source regions 11B and the channel regions 11D. As a result, the pixel electrodes 12 are charged to potentials based on the image signals. Light blocking portions 17 are disposed on the rear side of the channel regions 11D of the TFT having the configuration described above with respect to the Z-axis direction, that is, on an opposite side from the gate electrodes 11A to overlap the channel regions 11D. Each light blocking portion 17 has a horizontally-long rectangular shape in a plan view to extend in the X-axis direction. The light blocking portions 17 form island shapes. The light blocking portions 17 block light toward the channel regions 11D from the rear side. The light may be applied to the liquid crystal panel 10 by a backlight unit for image display. By blocking the light toward the channel regions 11D with the light blocking portions 17, variations in characteristics of the TFTs 11, which may occur when the channel regions 11D are subjected to the light, are less likely to occur.

Figure 4:
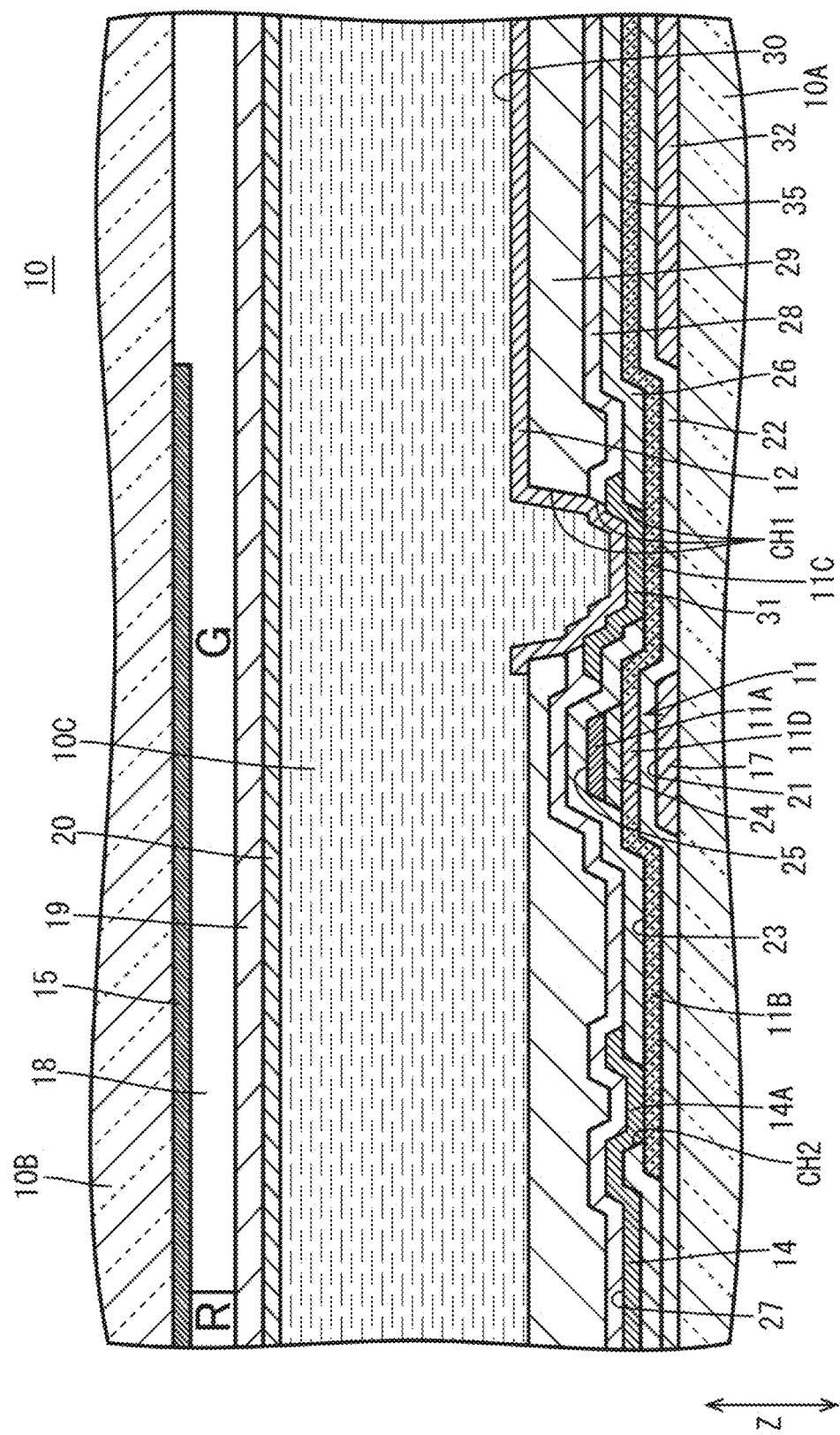
FIG. 4 is a cross-section view of the liquid crystal panel along line A-A in FIGS. 2 and 3.

FIG. 4 is a cross-sectional view of the liquid crystal panel 10 along line A-A in FIGS. 2 and 3. As illustrated in FIG. 4, a large number of color filters 18 are disposed at positions opposed to the pixel electrodes 12 in the array substrate 10A to form a matrix in an area of the CF substrate 10B in the display area. The color filters 18 include red (R), green (G), and blue (B) filters that are arranged in predefined sequence to form pixels, which are display units, together with the pixel electrodes 12 opposed thereto. In this embodiment, an arrangement pitch of the pixels in the X-axis direction is about 60 µm and an arrangement pitch of the pixels in the Y-axis direction is about 180 µm. The black matrix 15 described earlier is disposed between the adjacent color filter to reduce color mixture. An overcoat film 19 is formed on an inner surface side of the color filters 18 for planarization. A common electrode 20 is disposed on an inner surface of the overcoat film 19. The common electrode 20 is formed in a solid pattern at least in the display area and opposed to all pixel electrodes 12 via the liquid crystal layer 10C. When a reference potential (a common potential) is supplied to the common electrode 20, potential differences are created between the common electrode 20 and the pixel electrodes 12 that are charged by the TFTs 11. Orientation of the liquid crystal molecules in the liquid crystal layer 10C varies according to the potential differences. According to the configuration, predefined grayscale control can be performed for each pixel. The spacers 16 described earlier are formed on an inner surface side of the common electrode 20 (see FIGS. 2 and 3). The spacers 16 protrude from the inner surface of the CF substrate 10B in the Z-axis direction toward the array substrate 10A. Ends of the spacers 16 are disposed to contact or adjacent to the innermost surface of the array substrate 10A. Alignment films are formed on the innermost surfaces of the substrates 10A and 10B contacting the liquid crystal layer 10C, respectively, for orientation of the liquid crystal molecules included in the liquid crystal layer 10C. In this embodiment, vertical alignment films are used.

As illustrated in FIG. 4, the array substrate 10A includes various films stacked on an inner surface of a glass substrate (a substrate). The films on the inner surface of the array substrate 10A will be described in detail with reference to FIG. 4. As illustrated in FIG. 4, the array substrate 10A includes a first metal film 21 (a conductive film), a first insulator 22 (a lower layer-side insulator, an insulator), a semiconductor film 23, a second insulator 24 (a gate insulator, an insulator), a second metal film 25, a third insulator 26 (an insulator), a third metal film 27 (a conductive film), a fourth insulator 28 (an insulator), a fifth insulator 29 (an insulator), a transparent electrode film 30, and the alignment film. The first insulator 22 is disposed in a layer upper than the first metal film 21. The semiconductor film 23 is disposed in a layer upper than the first insulator 22. The second insulator 24 is disposed in a layer upper than the semiconductor film 23. The second metal film 25 is disposed in a layer upper than the second insulator 24. The third insulator 26 is disposed in a layer upper than the second metal film 25. The third metal film 27 is disposed in a layer upper than the third insulator 26. The fourth insulator 28 is disposed in a layer upper than the third metal film 27. The fifth insulator 29 is disposed in a layer upper than the fourth insulator 28. The transparent electrode film 30 is disposed in a layer upper than the fifth insulator 29. The alignment film is disposed in a layer upper than the transparent electrode film 30.

Figure 7:
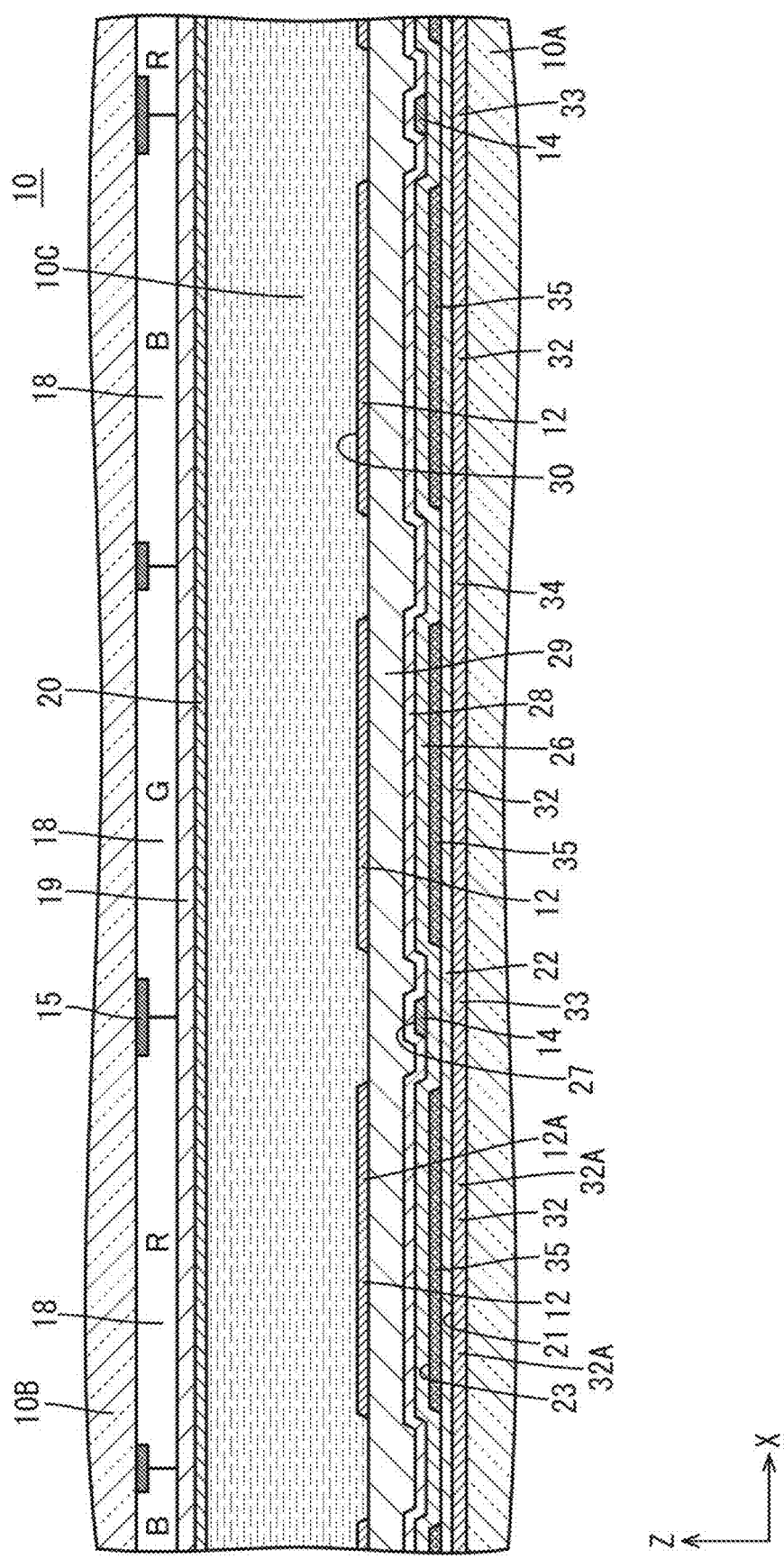
FIG. 7 is a cross-sectional view of a liquid crystal panel along line B-B in FIG. 2.
Figure 8:
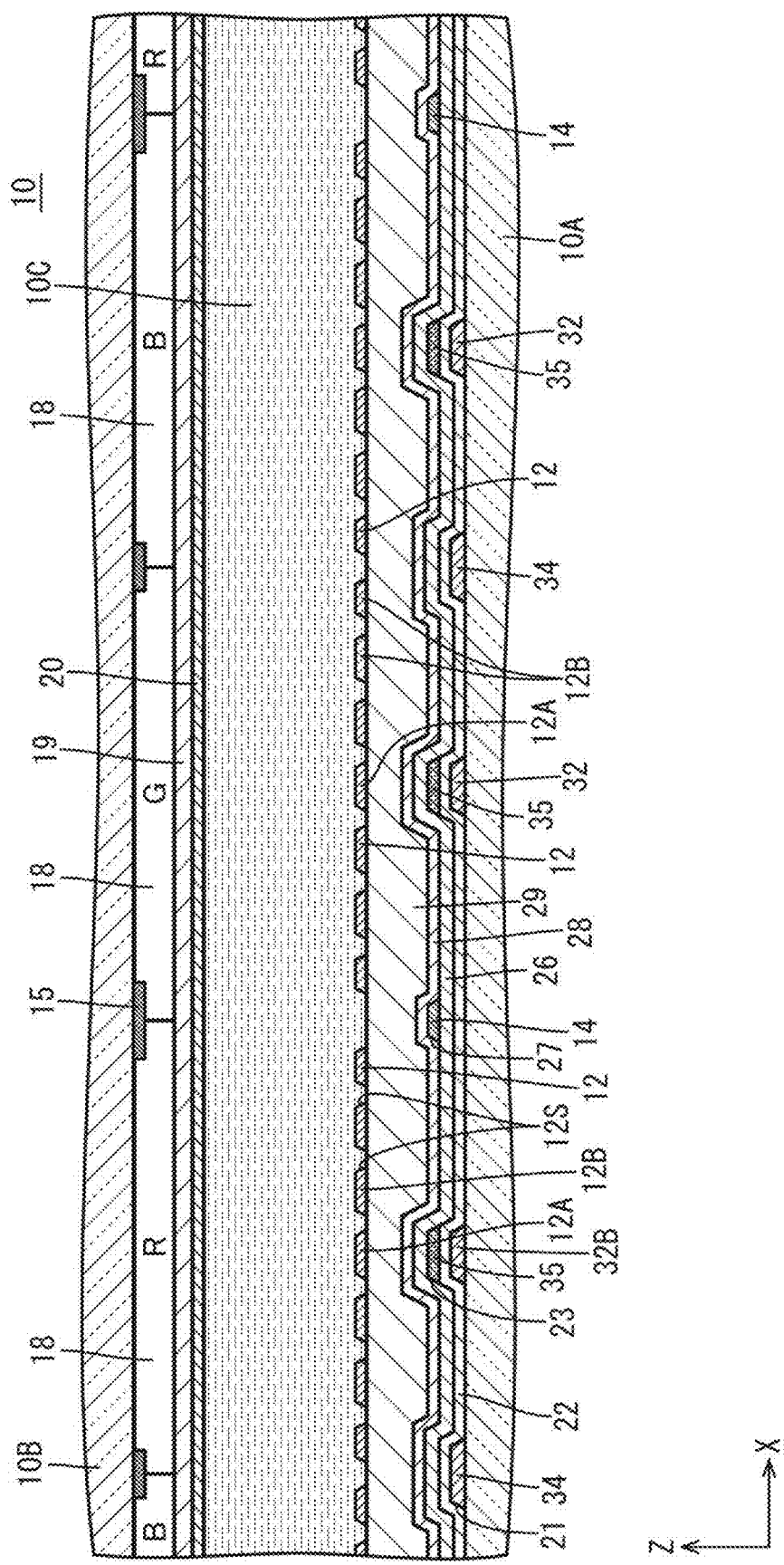
FIG. 8 is a cross-sectional view of a liquid crystal panel along line C-C in FIG. 2.

Each of the first metal film 21, the second metal film 25, and the third metal film 27 has a single-layer film made of one kind of metal or a multilayer film made of multiple kinds of metals or an alloy to have conductivity and a light blocking property. As illustrated in FIG. 4, the first metal film 21 includes sections that are configured as the light blocking portion 17. The second metal film 25 includes sections that are configured as the gate lines 13 and the gate electrodes 11A of the TFTs 11. The semiconductor film 23 is an oxide semiconductor film using an oxide semiconductor as a material. The semiconductor film 23 includes sections that are configured as the source regions 11B, the drain regions 11C, and the channel regions 11D of the TFTs 11. The material of the semiconductor film 23 may be an indium gallium zinc oxide (In—Ga—Zn—O) semiconductor. The In—Ga—Zn—O semiconductor is a ternary oxide containing indium (In), gallium (Ga), and zinc (Zn). In, Ga, and Zn may be contained at a ratio expressed by, but not limited to, In:Ga:Zn=2:2:1, In:Ga:Zn=1:1:1, or In:Ga:Zn=1:1:2. The In—Ga—Zn—O semiconductor may have an amorphous structure or a crystalline structure. When the In—Ga—Zn—O semiconductor having the crystalline structure is used, a crystalline In—Ga—Zn—O semiconductor having a c-axis that is substantially perpendicular to a layer surface is preferable. The semiconductor film 23 includes sections (not overlapping the second metal film 25) having resistances that are reduced in the production process, that is, the semiconductor film 23 includes the resistance-reduced sections and resistance non-reduced sections. In FIGS. 4, 7 and 8, the resistance reduced sections of the semiconductor film 23 are indicated by cross-hatching. The resistivity of the resistance reduced sections of the semiconductor film 23 is significantly small in comparison to the resistance non-reduced sections, for example, about $1/10000000000$ to $1/100$ of the resistivity of the resistance non-reduced sections. Therefore, the resistance reduced sections function as conductors. The resistance reduced sections of the semiconductor film 23 are configured as, but not limited to, the source regions 11B and the drain regions 11C of the TFTs 11. In the resistance non-reduced sections of the semiconductor film 23, charge transfer is allowed only under certain conditions (when scanning signals are supplied to the gate electrodes 11A). In the resistance reduced sections, the charge transfer is always allowed and thus the resistance reduced sections function as conductors. The resistance non-reduced sections of the semiconductor film 23 are configured as the channel regions 11D. The transparent electrode film 30 is made of a transparent electrode material such as indium tin oxide (ITO) and indium zinc oxide (IZO) and configured as, but not limited to, the pixel electrodes 12.

The first insulator 22, the second insulator 24, and the third insulator 26 are made of an inorganic insulating material (an inorganic resin material) such as $SiO_2$ (oxide silicon, silicon oxide). The fourth insulator 28 is made of an inorganic insulating material such as SiNx (silicon nitride). The fifth insulator 29 is made of PMMA (an acrylic resin), which is one kind of organic insulating materials (organic materials) having photosensitivity. The first insulator 22 is disposed between the first metal film 21 and the semiconductor film 23 to the first metal film 21 from the semiconductor film 23. The second insulator 24 is disposed between the semiconductor film 23 and the second metal film 25 to insulate the semiconductor film 23 from the second metal film 25. A distance between each of the gate electrodes 11A and the corresponding channel region 11D is maintained constant with sections of the second insulator 24 overlapping the gate electrodes 11A. The second insulator 24 is patterned using the second metal film 25 in the upper layer as a mask in the production of the array substrate 10A and thus sections of the second insulator 24 overlapping the second metal film 25 remain. The third insulator 26 is disposed between the semiconductor film 23 and the second metal film 25 and the third metal film 27 to insulate the films 23, 25, and 27 from each other. Sections of the third insulator 26 disposed at intersections between the gate lines 13 prepared from the first metal film 21 and the source lines 14 prepared from the second metal film 25 to insulate the gate lines 13 and the source lines 14 from each other. The fourth insulator 28 and the fifth insulator 29 are disposed between the third metal film 27 and the transparent electrode film 30 to insulate the third metal film 27 and the transparent electrode film 30 from each other. The fifth insulator 29 has a thickness larger than thicknesses of other insulators 22, 24, 26, and 28 that are made of inorganic resin materials and a function for planarizing a surface of the array substrate 10A. The fourth insulator 28 and the fifth insulator 29 of the insulators 22, 24, 26, 28, and 29 include pixel electrode contact holes CH1 at positions at which the drain regions 11C of the TFTs 11 overlap the pixel electrodes 12. The drain regions 11C of the TFTs 11 are connected to the pixel electrodes 12 via the pixel electrode contact holes CH1. Drain connecting portions 31 prepared from the third metal film 27 are disposed to overlap the pixel electrode contact holes CH1. The pixel electrode contact holes CH1 are drilled through the third insulator 26. The drain connecting portions 31 are connected to the drain regions 11C. The drain regions 11C are connected to the pixel electrodes 12 via the drain connecting portions 31. The pixel electrode contact holes CH1 in the third insulator 26 are covered with the drain connecting portions 31. Therefore, during etching of the third metal film 27 via a patterned photoresist, the drain regions 11C are less likely to be over-etched. The third insulator 26 includes source line contact holes CH2 at positions at which the source line branches 14A of the source lines 14 overlap the source regions 11B of the TFTs 11. The source line branches 14A of the source lines 14 are connected to the source regions 11B of the TFTs 11 via the source line contact holes CH2.

Figure 5:
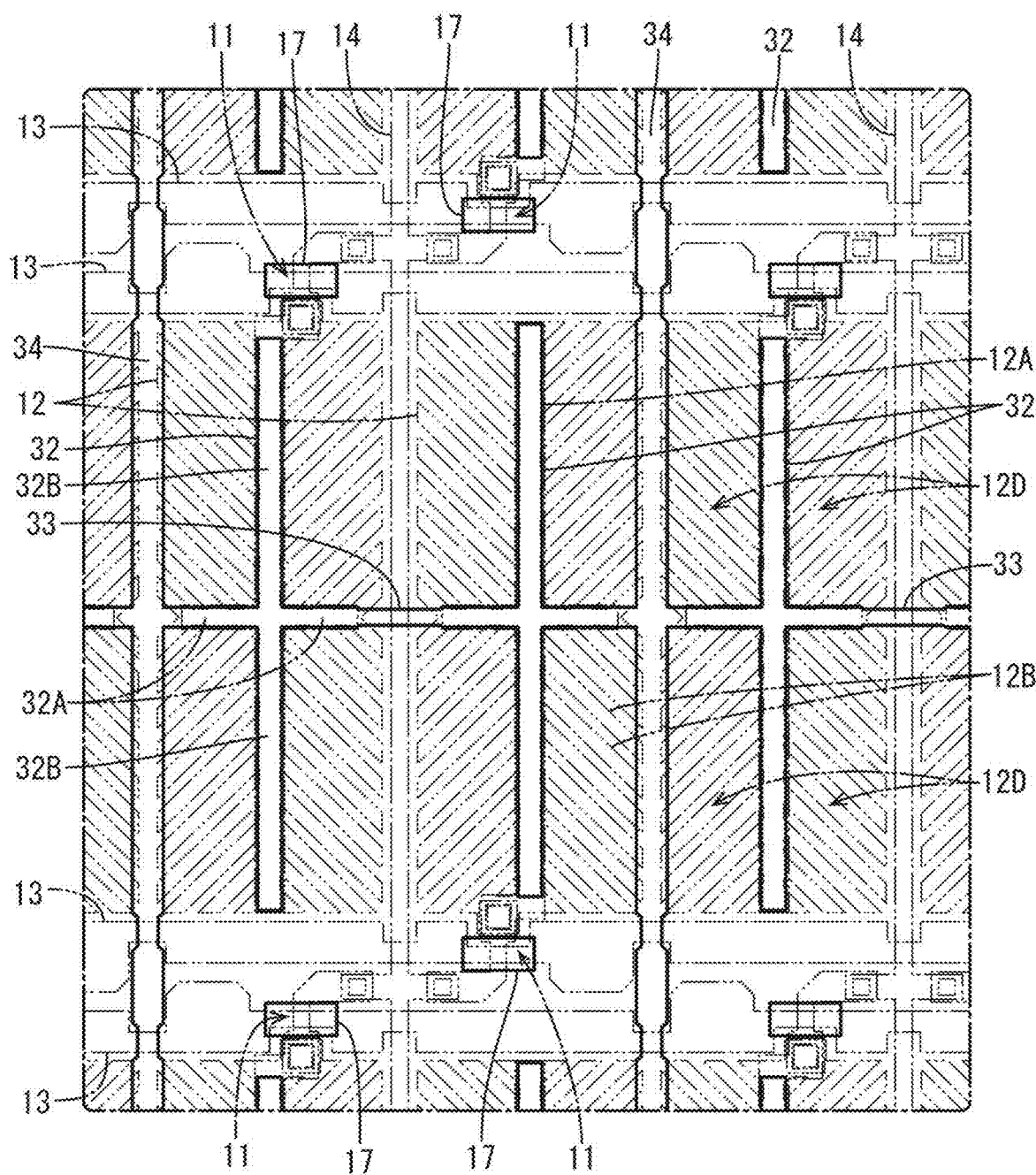
FIG. 5 is a plan view mainly illustrating a pattern of a first metal film included in the array substrate.

As illustrated in FIG. 5, the array substrate 10A in this embodiment includes capacitance forming portions 32 disposed to overlap the pixel electrodes 12. FIG. 5 is a plan view illustrating a pattern of the first metal film 21 included in the array substrate 10A by solid lines and other metal films 25 and 27 and the semiconductor film 23 by long-dashed double-dotted lines. The capacitance forming portions 32 are disposed in a matrix along the X-axis direction and the Y-axis direction in the display area of the array substrate 10A similar to the pixel electrodes 12 overlapping the capacitance forming portions 32. The number of the capacitance forming portions 32 is equal to the number of the pixel electrodes 12. First capacitance lines that extend in the X-axis direction and second capacitance lines that extend in the Y-axis direction are connected to the capacitance forming portions 32. The capacitance forming portions 32 are configured to form capacitances (auxiliary capacitance) between the capacitance forming portions 32 and the overlapping pixel electrodes 12 when the capacitance forming portions 32 are maintained at the reference potential supplied through first capacitance lines 33 and second capacitance lines 34. According to the configuration, the potentials of the charged pixel electrodes 12 can be maintained. The first capacitance lines 33 extend in the X-axis direction. The first capacitance lines 33 are coupled to the capacitance forming portions 32 adjacent to each other in the X-axis direction, respectively. The second capacitance lines 34 extend in the Y-axis direction. The second capacitance lines 34 are coupled to the capacitance forming portions 32 adjacent to each other in the Y-axis direction, respectively. According to the configuration, standard deviation in distribution regarding resistances of the capacitance forming portions 32 arranged in the X-axis direction and the Y-axis direction can be reduced in the display area. Regardless of positions in the display area, the capacitance forming portions 32 are more likely to be maintained at the constant reference potential. According to the configuration, the potentials at the pixel electrodes 12 that form the capacitances between the pixel electrodes 12 and the capacitance forming portions 32 are stably held and thus the display quality regarding display images can be improved. Furthermore, the capacitance forming portions 32, the first capacitance lines 33, and the second capacitance lines 34 are prepared from the first metal film 21. According to the configuration, the capacitance forming portions 32, the first capacitance lines 33, and the second capacitance lines 34 are directly coupled to one another and thus contact holes are not required for connecting them. A reduction in aperture ratio of the pixel electrodes 12 resulting from a connecting configuration including contact holes is less likely to occur. Therefore, the aperture ratio of the pixel electrodes 12 can be maintained high. This configuration can contribute to improvement in brightness of display images and a reducing in power consumption.

The capacitance forming portions 32 will be described in detail. As illustrated in FIG. 5, each of the capacitance forming portions 32 has a cross shape in a plan view and overlaps the trunk electrode portion 12A of the pixel electrode 12, that is, the boarders between the adjacent domains 12D. In the sections of the pixel electrode 12 around the borders between the domains 12D, it is difficult to orient the liquid crystal molecules in a target direction, that is, a direction along the slits 12S in which the pixel electrode 12 is not present. Therefore, an amount of transmitting light tends to be smaller. According to the configuration in which the capacitance forming portion 32 is disposed to overlap the sections of the pixel electrode 12 around the borders between the adjacent domains 12D, a reduction in transmitting light due to the capacitance forming portion 32 prepared from the first metal film 21 that blocks light and disposed to overlap the pixel electrode 12 is less likely to occur. In comparison to a configuration in which the capacitance forming portion 32 is disposed not to overlap the trunk electrode portion 12A but to overlap the domains 12D, the aperture ratio improves. The capacitance forming portions 32 having the cross shape in the plan view include first capacitance forming portions 32A that extend in the X-axis direction and second capacitance forming portions 32B that extend in the Y-axis direction. The first capacitance forming portions 32A overlap the sections of the trunk electrode portions 12A extending in the X-axis direction, that is, the borders between the domains 12D that are adjacent to each other in the Y-axis direction. The second capacitance forming portions 32B overlap the sections of the trunk electrode portions 12A extending in the Y-axis direction, that is, the borders between the domains 12D adjacent to each other in the X-axis direction. The capacitance forming portions 32 are prepared from the first metal film 21 (the conductive film) from which the light blocking portion 17 is prepared. As illustrated in FIGS. 7 and 8, the capacitance forming portions 32 overlap the pixel electrodes 12 with at least the first insulator 22, the third insulator 26, the fourth insulator 28, and the fifth insulator 29 between the capacitance forming portion 32 and the pixel electrodes 12.

Next, the first capacitance lines 33 and the second capacitance lines 34 will be described in detail. As illustrated in FIG. 5, the first capacitance lines 33 extend in the X-axis direction. The first capacitance lines 33 are coupled to the capacitance forming portions 32 adjacent to the first capacitance lines 33 in the X-axis direction. The first capacitance lines 33 are disposed to connect the capacitance forming portions 32 arranged along the X-axis direction with the source line 14 therebetween. Namely, the first capacitance lines 33 are separated from each other in the X-axis direction to sandwich two capacitance forming portions 32 (the pixel electrodes 12) and one second capacitance line 34. The number of the first capacitance lines 33 arranged in the X-axis direction is about equal to the number of source lines 14. The first capacitance lines 33 are coupled to the first capacitance forming portions 32A that are included in the capacitance forming portions 32 and extend in the X-axis direction such that the first capacitance lines 33 and the first capacitance forming portions 32A form straight lines. The first capacitance lines 33 are aligned with the first capacitance forming portions 32A with respect to the Y-axis direction. The first capacitance lines 33 and the capacitance forming portions 32 are coupled to each other with the shortest route. Therefore, a reduction in amount of transmitting light through the pixel electrodes 12 resulting from them is less likely to occur. This configuration can contribute to further improvement of the aperture ratio. The first capacitance lines 33 cross the source lines 14. The capacitance lines 33 are prepared from the first metal film 21 from which the light blocking portion 17 and the capacitance forming portions 32 are prepared. As illustrated in FIG. 7, the first capacitance lines 33 overlap the source lines 14 with the first insulator 22 and the third insulator 26 therebetween.

As illustrated in FIG. 5, the second capacitance lines 34 extend in the Y-axis direction. The second capacitance lines 34 are coupled to the capacitance forming portions 32 adjacent to each other in the Y-axis direction, respectively. Each second capacitance line 34 is sandwiched between two pixel electrodes 12 that are sandwiched between the adjacent source lines 14. Each second capacitance line 34 is coupled to two capacitance forming portions 32 sandwiched between the source lines 14 among the capacitance forming portions arranged in the X-axis direction. Namely, the second capacitance lines 34 are separated from each other in the X-axis direction to sandwich two capacitance forming portions 32 (the pixel electrodes 12) and one first capacitance line 33. The number of the second capacitance lines 34 arranged in the X-axis direction is about equal to the number of source lines 14 or the number of the first capacitance lines 33. The first capacitance lines 33 and the second capacitance lines 34 are alternately and repeatedly arranged in the X-axis direction to sandwich the capacitance forming portions 32 (the pixel electrodes 12) between the first capacitance lines 33 and the second capacitance lines 34. The capacitance forming portions 32 arranged in the matrix within the display area are connected to each other via the first capacitance lines 33 and the second capacitance lines 34 that are routed in a grid along the X-axis direction and the Y-axis direction. According to the configuration, the standard deviation in distribution regarding resistances of the capacitance forming portions 32 can be further reduced. Therefore, the potentials at the pixel electrodes 12 that form the capacitances with the capacitance forming portions 32 are further stably held. Each second capacitance line 34 is disposed in a space between two pixel electrodes 12 that are sandwiched between the adjacent source lines 14. In comparison to a configuration in which the second capacitance lines 34 overlap the pixel electrodes 12, a larger amount of transmitting light through the pixel electrodes 12 can be obtained. This configuration is preferable for improving the aperture ratio. The width of the second capacitance lines 34 is larger than the width of the source lines 14. Side edges of the second capacitance lines 34 overlap the side edges of the adjacent pixel electrodes 12. The second capacitance lines 34 are prepared from the first metal film 21 from which the light blocking portion 17, the capacitance forming portions 32, and the first capacitance lines 33. As illustrated in FIG. 8, the side edges of the second capacitance lines 34 overlap the side edges of the pixel electrodes 12 with the first insulator 22, the third insulator 26, the fourth insulator 28, and the fifth insulator 29 therebetween. Because the light blocking portion 17, the capacitance forming portions 32, the first capacitance lines 33, and the second capacitance lines 34 are prepared from the same first metal film 21. In the production, they can be patterned using the same photomask. This configuration is preferable for reducing the number of photomasks.

Figure 6:
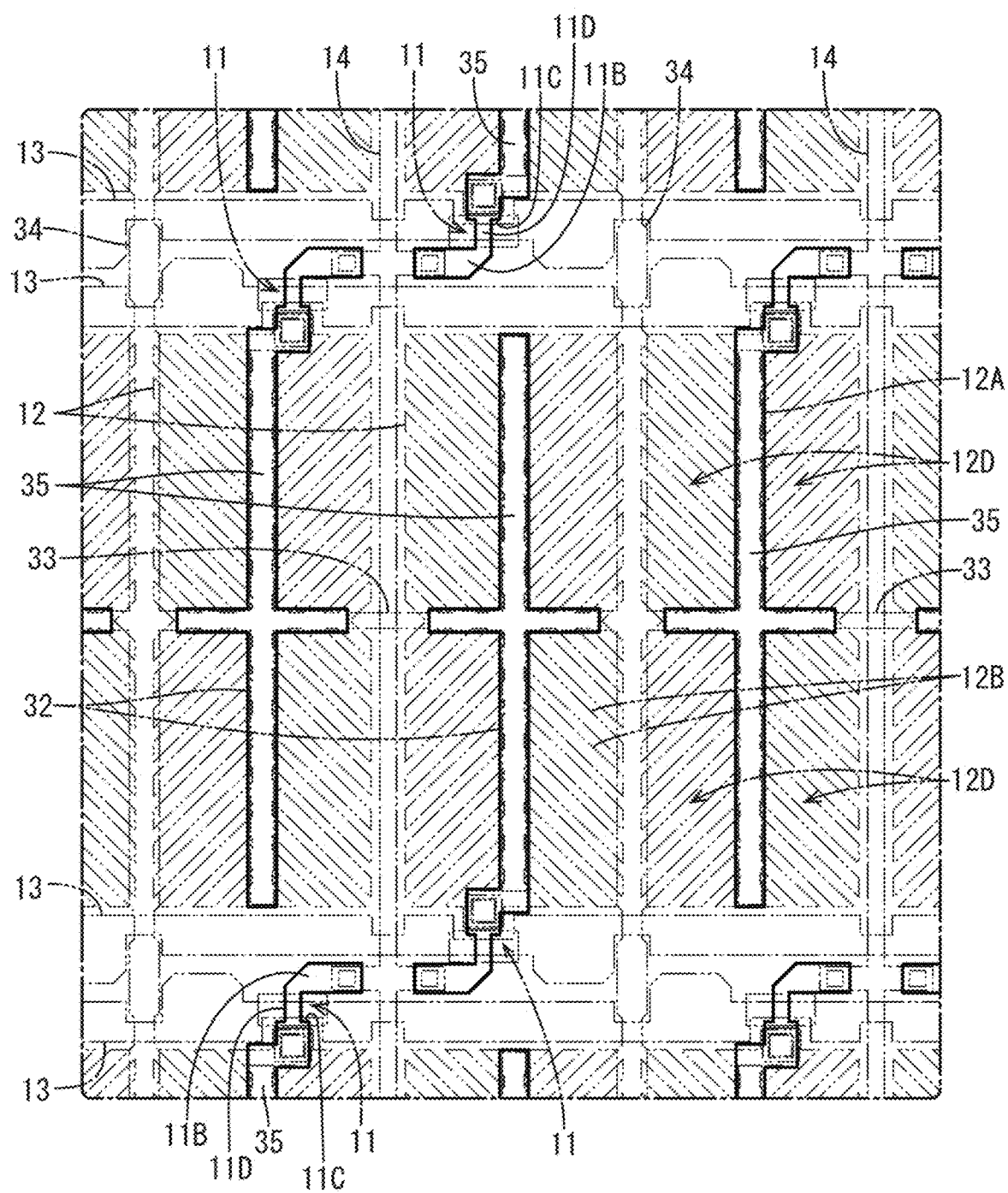
FIG. 6 is a plan view mainly illustrating a pattern of a semiconductor film included in the array substrate.

As illustrated in FIG. 6, in the display area of the array substrate 10A, resistance reduced portions 35 are disposed to overlap the capacitance forming portions 32. The resistance reduced portions 35 are resistance reduced sections of the semiconductor film 23. FIG. 6 is a plan view illustrating a pattern of the semiconductor film 23 included in the array substrate 10A by solid lines and other metal films 21, 25, and 27 by long-dashed double-dotted lines. Specifically, each of the resistance reduced portions 35 has a cross shape in a plan view similar to the capacitance forming portions 32. About entire areas of the resistance reduced portions 35 overlap the capacitance forming portions 32. Therefore, the resistance reduced portions 35 overlap the trunk electrode portions of the pixel electrodes 12 (the borders between the adjacent domains 12D). The resistance reduced portions 35 that are the resistance reduced sections of the semiconductor film 23 are coupled to the drain regions 11C that are the same resistance reduced sections. The resistance reduced portions 35 are at the same potential as the drain regions 11C and the pixel electrodes 12. According to the configuration, image signals transmitted through the source lines 14 according to driving of the TFTs 11 are supplied from the source regions 11B to the drain regions 11C, the pixel electrodes 12, and the resistance reduced portions 35 via the channel regions 11D. As illustrated in FIGS. 7 and 8, the resistance reduced portions 35 are disposed to overlap the capacitance forming portions 32 with only the first insulator 22 therebetween. In comparison to the pixel electrodes 12, the resistance reduced portions 35 are closer to the capacitance forming portions 32 by the thicknesses of the third insulator 26, the fourth insulator 28, and the fifth insulator 29. In comparison to capacitances formed between the pixel electrodes 12 and the capacitance forming portions 32 in a configuration that does not include the resistance reduced portions 35, the capacitances formed between the resistance reduced portions 35 and the capacitance forming portions 32 are larger. Therefore, the potentials at the pixel electrodes 12 are stably held.

As described above, the array substrate 10A in this embodiment includes the pixel electrodes 12 (the electrodes), the capacitance forming portions 32, the first capacitance lines 33, and the second capacitance lines 34. The pixel electrodes 12 are arranged in the first direction and the pixel electrodes 12 are arranged in the second direction perpendicular to the first direction. The capacitance forming portions 32 are arranged in the first direction and the capacitance forming portions 32 are arranged in the second direction. The capacitance forming portions 32 are disposed to overlap the pixel electrodes 12 via the first insulator 22, the third insulator 26, the fourth insulator 28, and the fifth insulator 29 that are insulators. The first capacitance lines 33 are prepared from the first metal film 21 (the conductive film) from which the capacitance forming portions 32 are prepared. The first capacitance lines 33 extend in the first direction. The first capacitance lines 33 are coupled to the capacitance forming portions 32 adjacent to each other in the first direction, respectively. The second capacitance lines 34 are prepared from the first metal film 21 from which the capacitance forming portions 32 are prepared. The second capacitance lines 34 extend in the second direction. The second capacitance lines 34 are coupled to the capacitance forming portions 32 adjacent to each other in the second direction, respectively.

Because the capacitance forming portions 32 are disposed to overlap the pixel electrodes 12 via the first insulator 22, the third insulator 26, the fourth insulator 28, and the fifth insulator 29 that are insulators, the capacitances are formed between the pixel electrodes 12 and the capacitance forming portions 32. According to the configuration, the potentials at the pixel electrodes 12 can be held. The first capacitance lines 33 extend in the first direction. The first capacitance lines 33 are coupled to the capacitance forming portions 32 adjacent to each other in the first direction, respectively. The second capacitance lines 34 extend in the second direction. The second capacitance lines 34 are coupled to the capacitance forming portions 32 adjacent to each other in the second direction, respectively. According to the configuration, the standard deviation in distribution regarding resistances of the capacitance forming portions 32 arranged in the first direction and the second direction can be reduced. Therefore, the potentials at the pixel electrodes 12 are stably held. The capacitance forming portions 32, the first capacitance lines 33, and the second capacitance lines 34 are prepared from the same first metal film 21. Therefore, contact holes are not require for connecting the capacitance forming portions 32, the first capacitance lines 33, and the second capacitance lines 34 to one another. Therefore, the aperture ratio of the pixel electrodes can be maintained high.

The gate lines 13 (the first lines) and the source lines 14 (the second lines) are provided. Each gate line 13 is disposed between the pixel electrodes 12 that are adjacent to each other in the second direction. The gate lines 13 extend in the first direction and cross the second capacitance lines 34 via the first insulator 22 and the second insulator 24 that are insulators. Each source line 14 is disposed between the pixel electrodes 12 that are adjacent to each other in the first direction. The source lines 14 extend in the second direction and cross the first capacitance lines 33 via the first insulator 22 and the third insulator 26 that are insulators. Because the gate lines 13 and the source lines 14 cross the first capacitance lines 33 and the second capacitance lines 34 via the first insulator 22, the second insulator 24, and the third insulator 26 that are insulators, short-circuits are less likely to occur among them. The capacitance forming portions 32, the first capacitance lines 33, and the second capacitance lines 34 are prepared from the first metal film 21 with the first insulator 22, the second insulator 24, and the third insulator 26 between the first metal film 21 and the gate lines 13 or the source lines 14. Therefore, contact holes are not required for connecting the capacitance forming portions 32, the first capacitance lines 33, and the second capacitance lines 34 to one another.

The TFTs 11 (the switching components) and the light blocking portions 17 are provided. The TFTs 11 include the gate electrodes 11A, the source regions 11B, the channel regions 11D, and the drain regions 11C. The gate electrodes 11A are connected to the gate lines 13. The source regions 11B are connected to the source lines 14. The first ends of the channel regions 11D are connected to the source regions 11B. The channel regions 11D are prepared from the semiconductor film 23 and disposed to overlap the gate electrodes 11A from the lower layer side via the second insulator 24 (the gate insulator). The drain regions 11C are connected to the second ends of the channel regions 11D. The light blocking portions 17 are disposed to overlap the channel regions 11D from the lower layer side via the first insulator 22 (the lower layer insulator). The light blocking portions 17 are prepared from the first metal film 21 from which the capacitance forming portions 32, the first capacitance lines 33, and the second capacitance lines 34 are prepared. According to the configuration, when the signals transmitted through the gate lines 13 are supplied to the gate electrodes 11A, the TFTs 11 turn on. The signals transmitted through the source lines 14 are supplied from the source regions 11B to the drain regions 11C via the channel regions 11D. Because the light blocking portion 17 is disposed to overlap the channel regions 11D that are prepared from the semiconductor film 23 from the lower layer side via the first insulator 22, light toward the channel regions 11D from the lower layer side can be blocked by the light blocking portion 17. According to the configuration, variations in characteristics of the TFTs 11, which may occur when the channel regions 11D are subjected to the light, are less likely to occur. Because the light blocking portion 17, the capacitance forming portions 32, the first capacitance lines 33, and the second capacitance lines 34 are prepared from the same first metal film 21, they can be patterned using the same photomask in the production. This configuration is preferable for reducing the number of the photomasks.

The pixel electrodes 12 are disposed in the layer upper than the drain regions 11C and connected to the drain regions 11C. When the TFTs 11 turn on, signals transmitted through the source lines 14 are supplied to the pixel electrodes 12 via the source regions 11B, the channel regions 11D, and the drain regions 11C. Therefore, the pixel electrodes 12 are charged to potentials based on the signals transmitted through the source lines 14.

The resistance reduced portions 35 are provided. The resistance reduced portions 35 are prepared by reducing the resistances of the sections of the semiconductor film 23. The resistance reduced portions 35 are disposed to overlap the capacitance forming portions 32 via the first insulator 22 that is an insulator and connected to the drain regions 11C. When the TFTs 11 are drive, signals transmitted through the source lines 14 are supplied from the source regions 11B to the drain regions 11C, the pixel electrodes 12, and the resistance reduced portions 35 via the channel regions 11D. The resistance reduced portions 35 are disposed in the layer lower than the pixel electrodes 12 that are disposed in the layer upper than the drain regions 11C, that is, the resistance reduced portions 35 are disposed closer to the capacitance forming portions 32. In comparison to capacitances between the pixel electrodes 12 and the capacitance forming portion 32 in a configuration that does not include the resistance reduced portions 35, the capacitances between the resistance reduced portions 35 and the capacitance forming portions 32 are larger. According to the configuration, the potentials at the pixel electrodes 12 are stably held.

The TFTs 11 are provided. Each TFT 11 includes the gate electrode 11A, the source region 11B, the drain region 11C, and the channel region 11D. The gate electrode 11A is connected to the gate line 13. The source region 11B is connected to the source line 14. The drain region 11C is connected to the pixel electrode 12. The channel region 11D is prepared from the semiconductor film 23. The first end of the channel region 11D is connected to the source region 11B and the second end of the channel region 11D is connected to the drain region 11C. The channel region 11D is disposed to overlap the gate electrode 11A via the second insulator 24. The source lines 14 are arranged at intervals with two pixel electrodes 12 sandwiched every adjacent source lines 14. The gate lines 13 are disposed such that every two gate lines 13 are sandwiched between every two pixel electrodes adjacent to each other in the second direction. At least two TFTs 11 are provided so that the TFTs 11 are connected to the adjacent gate line 13 and the adjacent pixel electrode 12, respectively. Each second capacitance line 34 is disposed between two pixel electrodes 12 that are sandwiched between the adjacent source lines 14. According to the configuration, when signals transmitted through the gate lines 13 are supplied to the gate electrodes 11A, the TFTs 11 turn on. The signals transmitted through the source lines 14 are supplied from the source regions 11B to the drain regions 11C via the source regions 11B. Therefore, the pixel electrodes 12 connected to the drain regions 11C are charged to potentials based on the signals transmitted through the source lines 14. The source lines 14 are arranged at intervals such that two electrodes 12 are sandwiched between every adjacent source lines 14. Every two gate lines are sandwiched between every two pixel electrodes 12 that are adjacent to each other in the second direction. At least two TFTs 11 are provided so that the TFTs 11 are connected to the adjacent gate line 13 and the adjacent pixel electrode 12. According to the configuration, the pixel electrodes 12 arranged along the first direction and the pixel electrodes 12 arranged along the second direction can be charged to different potentials. According to the arrangement, the space is provided between every two pixel electrodes 12 that are sandwiched between the adjacent source lines 14. Each second capacitance line 34 that extends along the source line 14 is disposed in the space. In comparison to a configuration in which the second capacitance lines 34 are disposed to overlap the pixel electrodes 12, a larger amount of transmitting light through the pixel electrodes 12 can be obtained. This configuration is preferable for improving the aperture ratio.

Each pixel electrode 12 includes the domains 12D. The capacitance forming portions 32 are disposed to overlap the borders between the adjacent domains 12D of the pixel electrodes. Around the borders between the domains 12D of the pixel electrodes 12, it is difficult to orient the liquid crystal molecules in a target direction, that is, a direction along the slits 12S in which the pixel electrode 12 is not present. Therefore, an amount of transmitting light tends to be smaller. According to the configuration in which the capacitance forming portion 32 is disposed to overlap the sections of the pixel electrode 12 around the borders between the adjacent domains 12D, a reduction in transmitting light due to the capacitance forming portion 32 disposed to overlap the pixel electrode 12 is less likely to occur. In comparison to a configuration in which the capacitance forming portion 32 is disposed to overlap the domains 12D, the aperture ratio improves.

Each pixel electrode 12 includes the domains 12D that are arranged along the first direction and the second direction. Each capacitance forming portion 32 includes the first capacitance forming portions 32A and the second capacitance forming portions 32B. The first capacitance forming portions 32A are disposed to overlap the borders between the domains 12D that are adjacent to each other in the second direction. The second capacitance forming portions 32B are disposed to overlap the borders between the domains 12D that are adjacent to each other in the first direction. The first capacitance lines 33 and the first capacitance forming portions 32A are coupled to one another to form straight lines. Because the first capacitance lines 33 and the capacitance forming portions 32 are coupled to one another with the shortest route, a reduction in amount of transmitting light through the pixel electrodes 12 resulting from them is less likely to occur. This configuration can contribute to further improvement of the aperture ratio.

The liquid crystal panel 10 (the display device) according to this embodiment includes the array substrate 10A described above and the CF substrate 10B (the opposed substrate) opposed to the array substrate 10A. According to the liquid crystal panel, the potentials at the pixel electrodes 12 included in the array substrate 10A are stably held and thus the display quality can be improved.

Second Embodiment

A second embodiment will be described with reference to FIG. 9. The second embodiment includes a semiconductor film 123 having a configuration different from that of the first embodiment. Components, functions, and effects similar to those of the first embodiment previously described will not be described.

Figure 9:
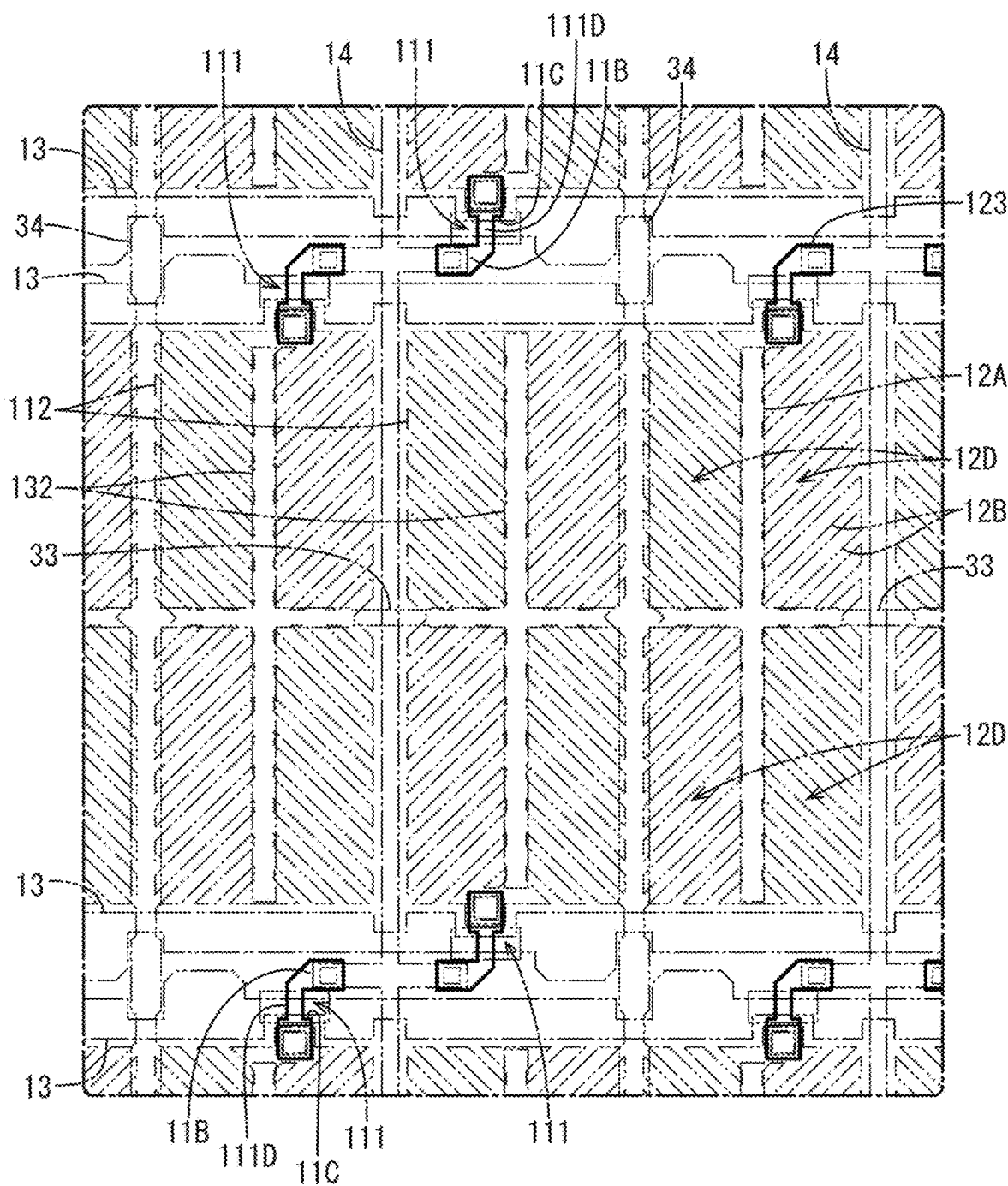
FIG. 9 is a plan view mainly illustrating a pattern of a semiconductor film included in an array substrate according to a second embodiment.

As illustrated in FIG. 9, the semiconductor film 123 included in an array substrate according to this embodiment includes only a resistance non-reduced section, that is, does not include a resistance reduced section. This embodiment does not include the resistance reduced portions 35 (see FIG. 6) included in the first embodiment. According to the configuration, the resistance reducing step performed on the semiconductor film 123 is not required in the production of the array substrate. This configuration is preferable for reducing the production cost. In this embodiment, potentials of pixel electrodes 112 are held with capacitances between the pixel electrodes 112 and capacitance forming portions 132. Therefore, it is preferable for set thicknesses of the first insulator, the third insulator, the fourth insulator, and the fifth insulator disposed between the pixel electrodes 112 and the capacitance forming portions 132 as small as possible. Especially, it is preferable that the fifth insulator made of the organic insulating material and having the largest thickness is omitted. Similar to the first embodiment, the second insulator is formed in sections overlapping the second metal film. Therefore, the second insulator is not present between the pixel electrodes 112 and the capacitance forming portions 132. According to the configuration, a distance between the pixel electrodes 112 and the capacitance forming portions 132 is maintained small as in the first embodiment. Because the resistance reducing step is not performed on the semiconductor film 123 in this embodiment, it is preferable to set a distance between a source line contact hole CH2 and a channel region 111D smaller than that of the first embodiment to maintain characteristics of a TFT 111 at high level.

Third Embodiment

Figure 11:
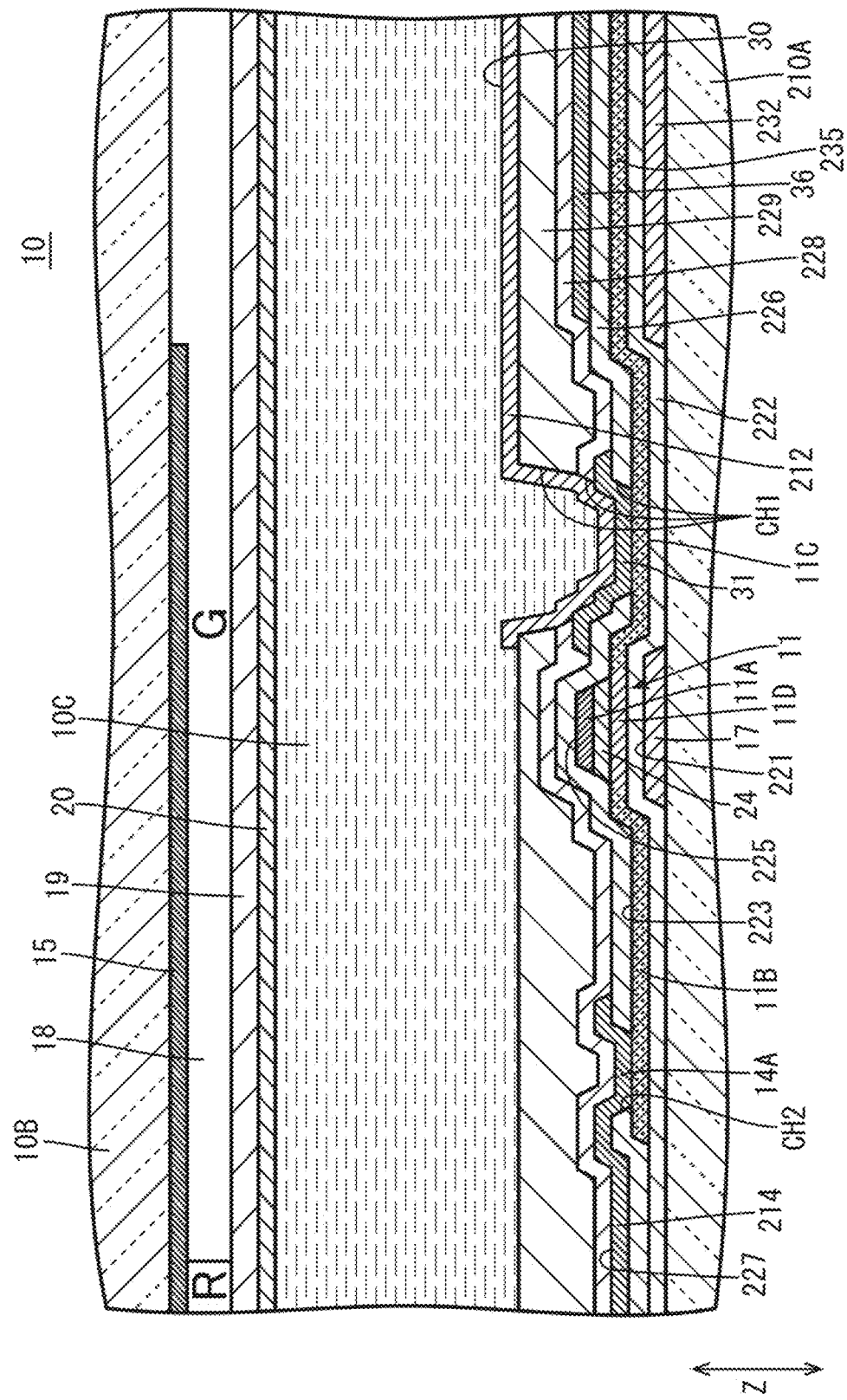
FIG. 11 is a cross-sectional view of a liquid crystal panel along line A-A in FIG. 10.
Figure 12:
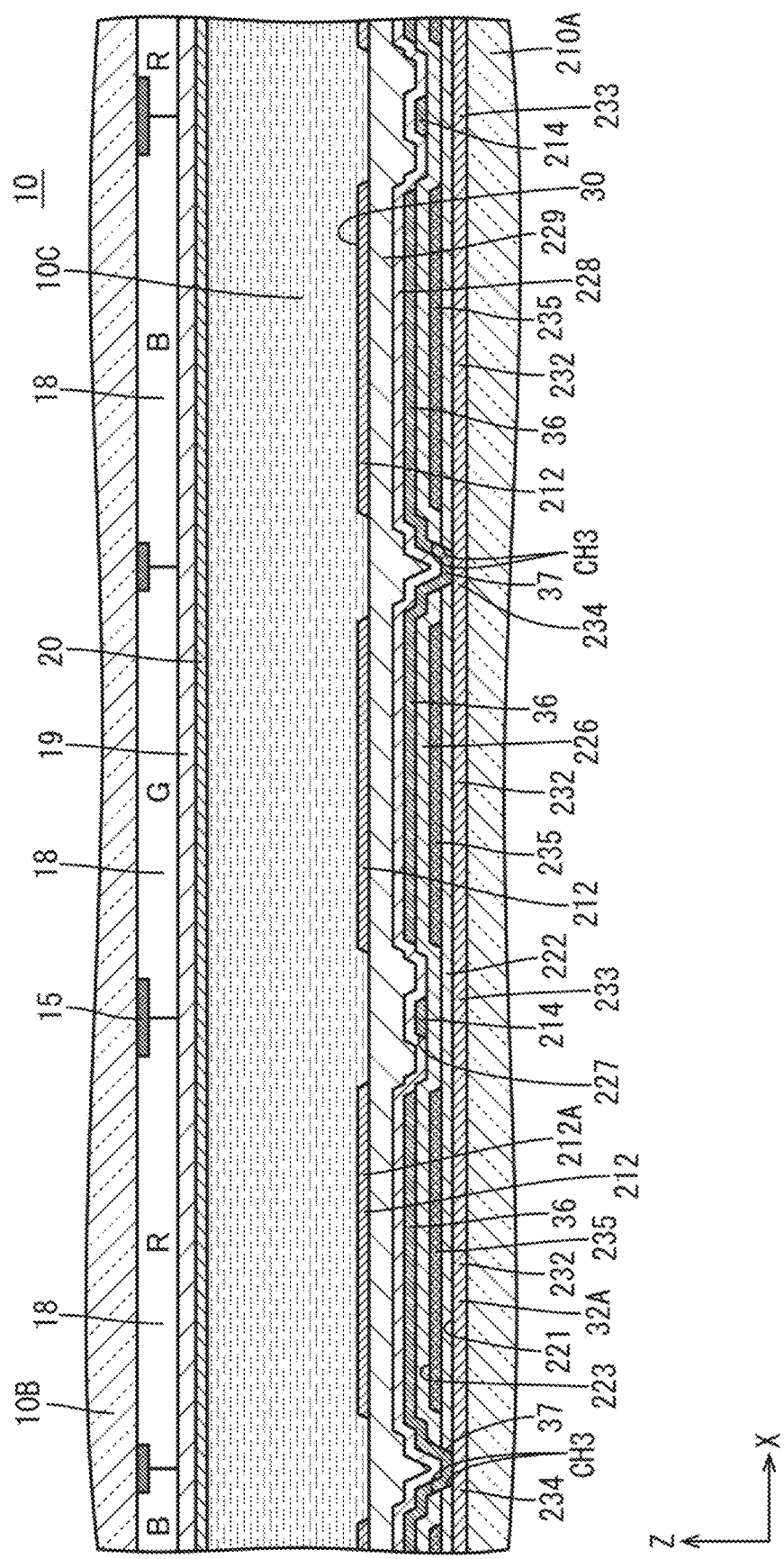
FIG. 12 is a cross-sectional view of a liquid crystal panel along line B-B in FIG. 10.

A third embodiment will be described in detail with reference to FIGS. 10 to 12. The third embodiment includes second capacitance forming portions 36 in addition to the configurations of the first embodiment. Components, functions, and effects similar to those of the second embodiment previously described will not be described.

Figure 10:
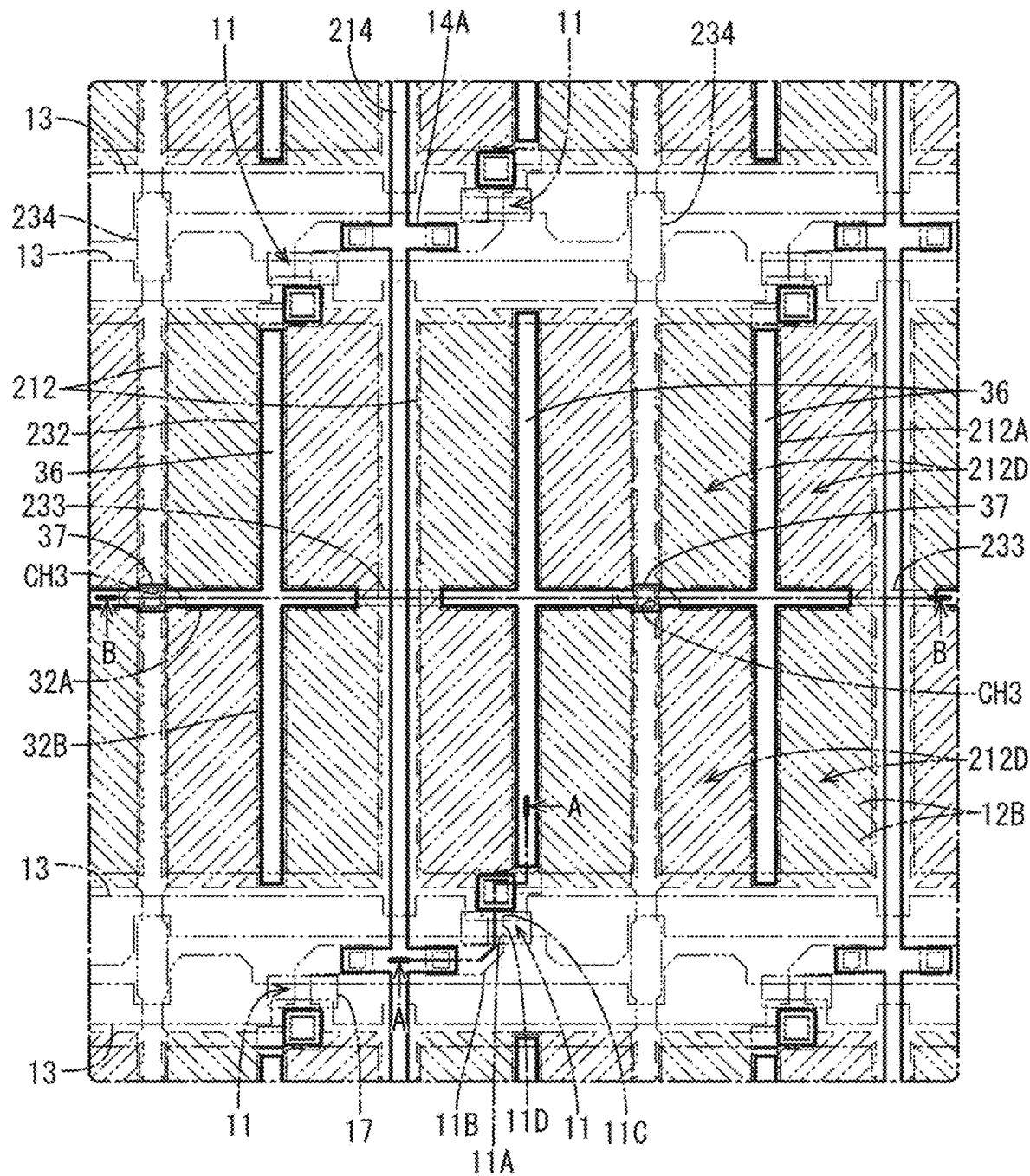
FIG. 10 is a plan view mainly illustrating a pattern of a third metal film included in an array substrate according to a third embodiment.

As illustrated in FIG. 10, an array substrate 210A includes second capacitance forming portions 36 prepared from a third metal film 227 from which source lines 214 are prepared and disposed to overlap pixel electrodes 212. FIG. 10 a plan view illustrating a pattern of the third metal film 227 included in the array substrate 210A is indicated by solid lines and other metal films 221 and 225 and a semiconductor film 223 by long-dashed double-dotted lines. The second capacitance forming portions 36 are disposed in a matrix along the X-axis direction and the Y-axis direction in a display area of the array substrate 210A similar to the pixel electrodes 212 (capacitance forming portions 232) overlapping the second capacitance forming portions 36. The number of the second capacitance forming portions 36 is equal to the number of the pixel electrodes 212 (the capacitance forming portions 232). As illustrated in FIG. 11, the second capacitance forming portions 36 are disposed to overlap the capacitance forming portions 232 and resistance reduced portions 235 in addition to the pixel electrodes 212. Each second capacitance forming portion 36 is connected to the capacitance forming portion 232 and at the same potential as the capacitance forming portion 232. Each second capacitance forming portion 36 is configured to form a capacitance between the second capacitance forming portion 36 and the overlapping pixel electrode 12 disposed in an upper layer via a fourth insulator 228 and a fifth insulator 229. Furthermore, each of the second capacitance forming portions 36 is configured to form a capacitance between the second capacitance forming portion 36 and the overlapping resistance reduced portion 235 disposed in a lower layer via a third insulator 226. Similar to the first embodiment, each of the capacitance forming portions 232 is configured to form the capacitance forming portion 232 and the resistance reduced portion 235 disposed in an upper layer via a first insulator 222. According to the configuration, the capacitance between the pixel electrode 212 and the resistance reduced portion 235 and the capacitance between the capacitance forming portion 232 and the second capacitance forming portion 36 are larger in comparison to the first embodiment. Therefore, the potentials at the pixel electrodes 212 can be properly held.

Specifically, as illustrated in FIG. 10, each of the second capacitance forming portions 36 has a cross shape in a plan view similar to the shapes of the capacitance forming portion 232 and the resistance reduced portion 235. About an entire area of the second capacitance forming portion 36 overlaps the capacitance forming portion 232 and the resistance reduced portion 235. The second capacitance forming portions 36 overlap trunk electrode portions 212A (borders between adjacent domains 212D) of the pixel electrodes 212. According to the configuration, a reduction in amount of transmitting light through the pixel electrodes 212 resulting from arrangement of the second capacitance forming portion 36 prepared from the third metal film 227 that blocks light overlapping the pixel electrodes 212 is less likely to occur. In comparison to a configuration in which the second capacitance forming portions 36 are disposed not to overlap the trunk electrode portions 212A but to overlap the domains 212D, the aperture ratio improves.

As illustrated in FIG. 10, in the display area of the array substrate 210A, connecting portions 37 for connecting the second capacitance forming portions 36 that are adjacent to each other in the X-axis direction are disposed. Specifically, each of the connecting portions 37 is coupled to two second capacitance forming portions 36 overlapping the adjacent pixel electrodes 212 that sandwich the second capacitance line 234. The connecting portions 37 are prepared from the third metal film 227 from which the second capacitance forming portions 36 are prepared and directly connected to the second capacitance forming portions 36 without using contact holes. Because every two second capacitance forming portions 36 are coupled to each other by corresponding one of the connecting portions 37, the standard deviation in distribution regarding resistances of the capacitance forming portions 232 and the second capacitance forming portions 36 can be further reduced. According to the configuration, the potentials at the pixel electrodes 212 are stably held. Each connecting portion 37 is sandwiched between two pixel electrodes 212 that are sandwiched between the adjacent source lines 214. The connecting portions 37 cross and overlap the second capacitance lines 234. As illustrated in FIG. 12, the connecting portions 37 prepared from the third metal film 227 are connected to the second capacitance lines 234 prepared from the first metal film 221 via the contact holes CH3 drilled through the first insulator 222 and the third insulator 226 disposed between the connecting portions 37 and the second capacitance lines 234. According to the configuration, the connecting portions 37 and the second capacitance lines 234 are connected to each other using the intersections therebetween. In comparison to a configuration in which the connecting portions 37 include extending sections connected to the second capacitance lines 234, a reduction in amount of light transmitted through the pixel electrodes 12 resulting from the connections between the connecting portions 37 and the second capacitance lines 234 is less likely to occur. Therefore, the aperture ratio improves. The number of the connecting portions 37 arranged in the X-axis direction is about equal to the number of the second capacitance lines 234.

As described above, this embodiment includes the second capacitance forming portions 36 prepared from the third metal film 227 (the conductive film) from which the source lines 214 are prepared, disposed to overlap the pixel electrodes 212 via the fourth insulator 228 and the fifth insulator 229 that are insulators, and connected to the capacitance forming portions 232. According to the configuration, the second capacitance forming portions 36 are disposed to overlap the pixel electrodes 212 via the fourth insulator 228 and the fifth insulator 229 in addition to the capacitance forming portions 232. Therefore, larger capacitances are formed between the pixel electrodes 212 and the capacitance forming portions 232 and between the pixel electrodes 212 and the second capacitance forming portions 36. According to the configuration, the potentials at the pixel electrodes 212 are further properly held.

Each connecting portion 37 is prepared from the third metal film 227 from which the source lines 214 are prepared and coupled to two second capacitance forming portions 36 that overlap the respective pixel electrodes 212 adjacent to each other with the second capacitance line 234 therebetween. Because every two second capacitance forming portions 36 are disposed to overlap the pixel electrodes 212 that are adjacent to each other with the second capacitance line 234 therebetween and coupled to each other by corresponding one of the connecting portions 37, the standard deviation in distribution regarding resistances of the capacitance forming portions 232 and the second capacitance forming portions 36 can be further reduced. According to the configuration, the potentials at the pixel electrodes 212 are stably held.

The connecting portions 37 are disposed to cross the second capacitance lines 234 via the first insulator 222 and the third insulator 226 that are the insulators and connected to the second capacitance lines 234 via the contact holes CH3 drilled through the first insulator 222 and the third insulator 226 that are the insulators between the connecting portions 37 and the second capacitance lines 234. Because the connecting portions 37 and the second capacitance lines 234 are connected to each other using the intersections therebetween, a reduction in an amount of light transmitted through the pixel electrodes 212 resulting from the connection between the connecting portions 37 and the second capacitance lines 234 is less likely to occur. Therefore, the aperture ratio improves.

The pixel electrodes 212 include the domains 212D. Each second capacitance forming portion 36 is disposed to overlap the borders between the adjacent domains 212D of the corresponding pixel electrode 212. In the sections of each of the pixel electrodes 212 closer to the borders between the domains 212D, it is difficult to control the orientation of the liquid crystal molecules to be in the direction along the slits 12S in which the pixel electrodes 212 are not present. Therefore, a local reduction in amount of transmitting light tends to occur. Each second capacitance forming portion 36 is disposed to overlap the borders of the adjacent domains 212D of each of the pixel electrodes 212. Therefore, the local reduction resulting from arrangement of the second capacitance forming portions 36 overlapping the pixel electrodes 212 is less likely to occur. In comparison to a configuration in which the second capacitance forming portions 36 are disposed to overlap the domains 212D, the aperture ratio improves.

Fourth Embodiment

A fourth embodiment will be described in detail with reference to FIGS. 13 to 18. The fourth embodiment includes an array substrate 41 included in an organic EL display panel 40 (an organic EL display device). Components, functions, and effects similar to those of the first embodiment previously described will not be described.

Figure 13:
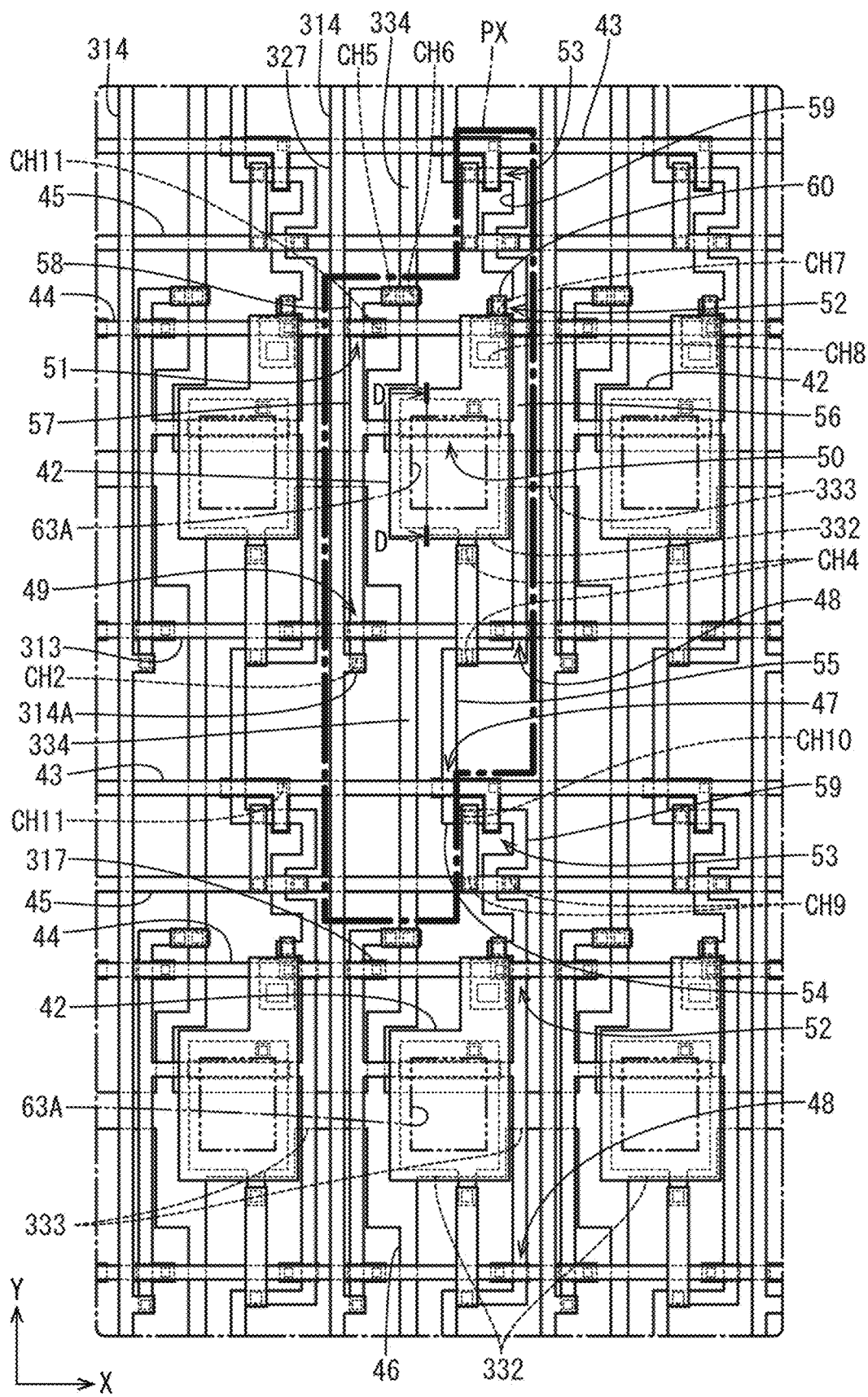
FIG. 13 is a plan view illustrating arrangement of pixels in an array substrate included in an organic EL display panel according to a fourth embodiment.

As illustrated in FIG. 13, the organic EL display panel 40 according to this embodiment includes the array substrate 41 on which various lines are formed. In this embodiment, an organic EL device layer (a light emitting portion), a negative electrode layer, and a sealing layer are stacked on top of one another on the array substrate 41. The organic EL device layer has a known configuration including a hole-injection layer, a hole transport layer, an electron-injection layer, an electron transport layer, an a light emitting layer. The light emitting layer is sandwiched between the hole transport layer and the electron transport layer. The light emitting layer include light emitting substances that emit light when excited by energy created through a bond between an electron and a hole in the light emitting layer. The light emitted in the light emitting layer travel toward an opposite side from the array substrate 41 in the Z-axis direction (the thickness direction). Namely, the organic EL display panel 40 according to this embodiment is a so-called top emission type. A configuration of the array substrate 41 will be described in detail.

As illustrated in FIG. 13, the array substrate 41 includes anode electrodes 42 (electrodes) included in pixels PX that are display units. The anode electrodes 42 function as "reflecting electrodes" configured to reflect light emitted in the light emitting layer toward the opposite side from the array substrate 41 in the Z-axis direction. Each anode electrode 42 has a rectangular shape in a plan view. The anode electrodes 42 are arranged at intervals in a matrix along the X-axis direction and the Y-axis direction. Gate lines 313 and source lines 314 are arranged to separate the anode electrodes 42 from one another. The array substrate 41 includes sub-gate lines 43, EM lines 44, and initialization power supply lines 45 that extend along the gate lines 313. The sub-gate lines 43 and the initialization power supply lines 45 are disposed on an opposite side from the anode electrodes 42 relative to the gate lines 313 in the Y-axis direction with gaps. The initialization power supply lines 45 are disposed on an opposite side from the gate lines 313 relative to the sub-gate lines 43 in the Y-axis direction with gaps. Each initialization power supply line 45 is sandwiched between the corresponding sub-gate line 43 and the corresponding EM line 44 regarding the pixel PX that is scanned one before (at (n−1) in a scanning sequence). In this embodiment, the pixels PX are scanned from a lower side to an upper side in FIG. 13. The EM lines 44 are disposed on an opposite side from the gate lines 313 relative to the anode electrodes 42 in the Y-axis direction with gaps. The array substrate 41 includes anode-side power supply lines 46 (power supply lines). The anode-side power supply lines 46 extend in the X-axis direction and the Y-axis direction to form a grid and straddle the anode electrodes 42. Functions of the lines 43 to 46 will be described in detail later.

Figure 14:
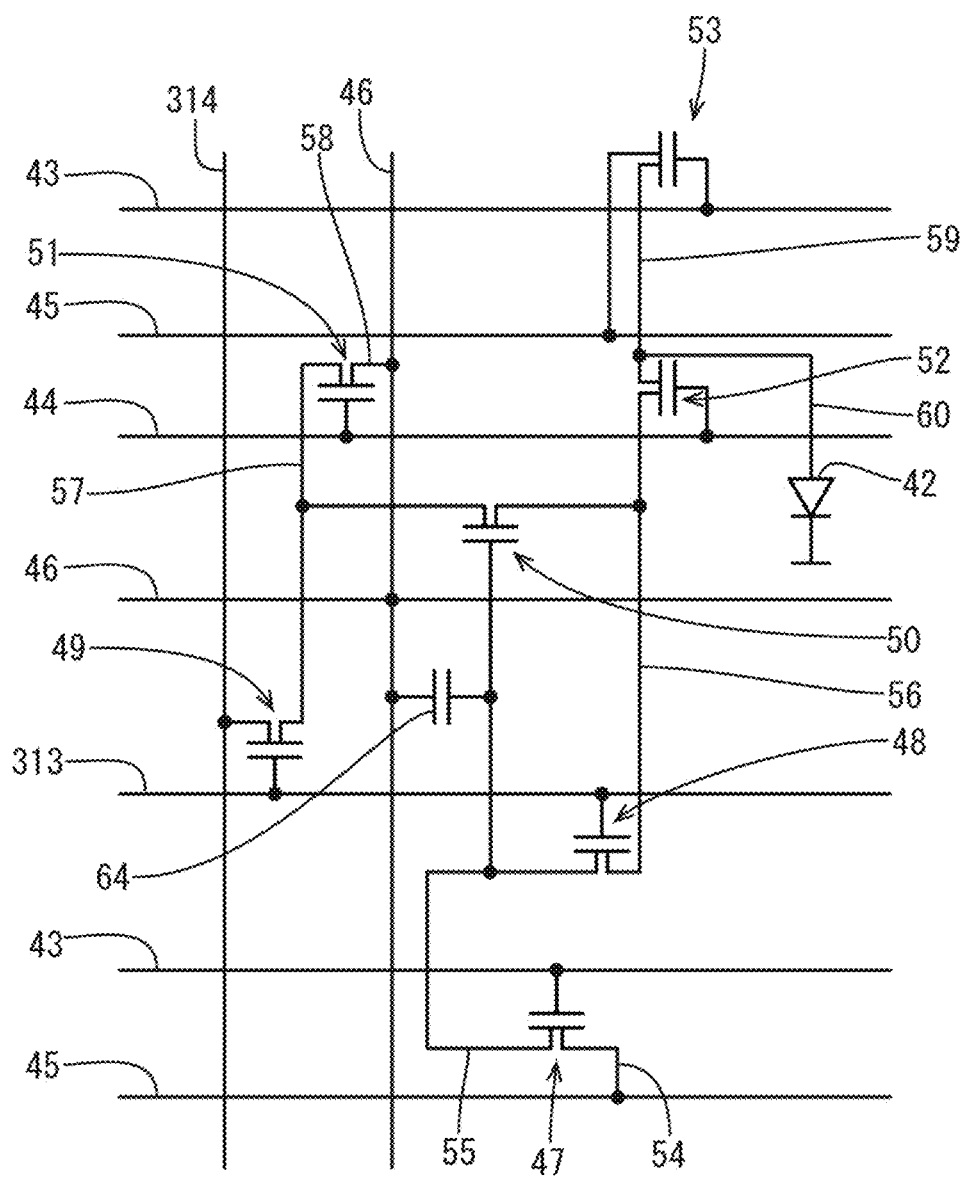
FIG. 14 is a circuit diagram illustrating an electrical configuration regarding the pixels in the array substrate.

As illustrated in FIGS. 13 and 14, the array substrate 41 includes TFTs 47 to 53. Seven TFTs 47 to 53 are provided for each pixel to apply voltages to the anode electrodes 42. FIG. 14 is a circuit diagram illustrating an electrical configuration of the pixel PX in the array substrate 41. The TFTs 47 to 53 include gate electrodes, source regions, drain regions, and channel regions. A basic configuration of each of the TFTs 47 to 53 is similar to that of the TFTs 11 (see FIGS. 3 and 4) in the first embodiment; however, the gate electrodes are connected to light blocking portions 317 and thus the light blocking portions 317 function as second gate electrodes. The channel region of each of the TFTs 47 to 53 is sandwiched between the gate electrode and the light blocking portion 317 that is the second gate electrode in the front-rear direction, that is, each of the TFTs 47 to 53 has a double-gate structure. Portions of the TFTs 47 to 53 (except for the light blocking portion 317) are not indicated by symbols.

As illustrated in FIGS. 13 and 14, the gate electrode and the light blocking portion 317 of the first TFT 47 among seven TFTs 47 to 53 are connected to the sub-gate line 43. The source region of the first TFT 47 is connected to a first connecting line 54. The drain region of the first TFT 47 is connected to a second connecting line 55. The gate electrode and the light blocking portion 317 of the second TFT 48 are connected to the gate line 313. The source region of the second TFT 48 is connected to a third connecting line 56. The drain region of the second TFT 48 is connected to the second connecting line 55. The gate electrode and the light blocking portion 317 of the third TFT 49 are connected to the gate line 313 to which the second TFT 48 is connected. The source region of the third TFT 49 is connected to the source line 314. The drain region of the third TFT 49 is connected to a fourth connecting line 57. The gate electrode and the light blocking portion 317 of the fourth TFT 50 are connected to the second connecting line 55. The source region of the fourth TFT 50 is connected to the fourth connecting line 57. The drain region of the fourth TFT 50 is connected to the third connecting line 56. The gate electrode and the light blocking portion 317 of the sixth TFT 52 are connected to the EM line 44 to which the fifth TFT 51 is connected. The source region of the sixth TFT 52 is connected to the third connecting line 56. The drain region of the sixth TFT 52 is connected to a sixth connecting line 59. The gate electrodes and the light blocking portion 317 of the seventh TFT 53 are connected to the sub-gate line 43 in the pixel PX that is scanned one after (at (n+1) in the scanning sequence). The source region of the seventh TFT 53 is connected to the first connecting line 54 in the pixel PX that is scanned one after (at (n+1) in the scanning sequence). The drain region of the seventh TFT 53 is connected to the sixth connecting line 59.

As illustrated in FIGS. 13 and 14, the first connecting line 54 is connected to the source region of the first TFT 47, the source region of the seventh TFT 53 included in the pixel PX that is scanned one before (at (n−1) in the scanning sequence), and the initialization power supply line 45. The second connecting line 55 is connected to the drain region of the first TFT 47, the drain region of the second TFT 48, and the gate electrode and the light blocking portion 317 of the fourth TFT 50. The third connecting line 56 is connected to the source region of the second TFT 48, the drain region of the fourth TFT 50, and the source region of the sixth TFT 52. The fourth connecting line 57 is connected to the drain region of the third TFT 49, the source region of the fourth TFT 50, and the drain region of the fifth TFT 51. A fifth connecting line 58 is connected to the source region of the fifth TFT 51 and the anode-side power source line 46. The sixth connecting line 59 is connected to the drain region of the sixth TFT 52 and the drain region of the seventh TFT 53. Furthermore, the array substrate 41 includes a seventh connecting line 60 connected to the sixth connecting line 59 and the anode electrode 42.

Figure 15:
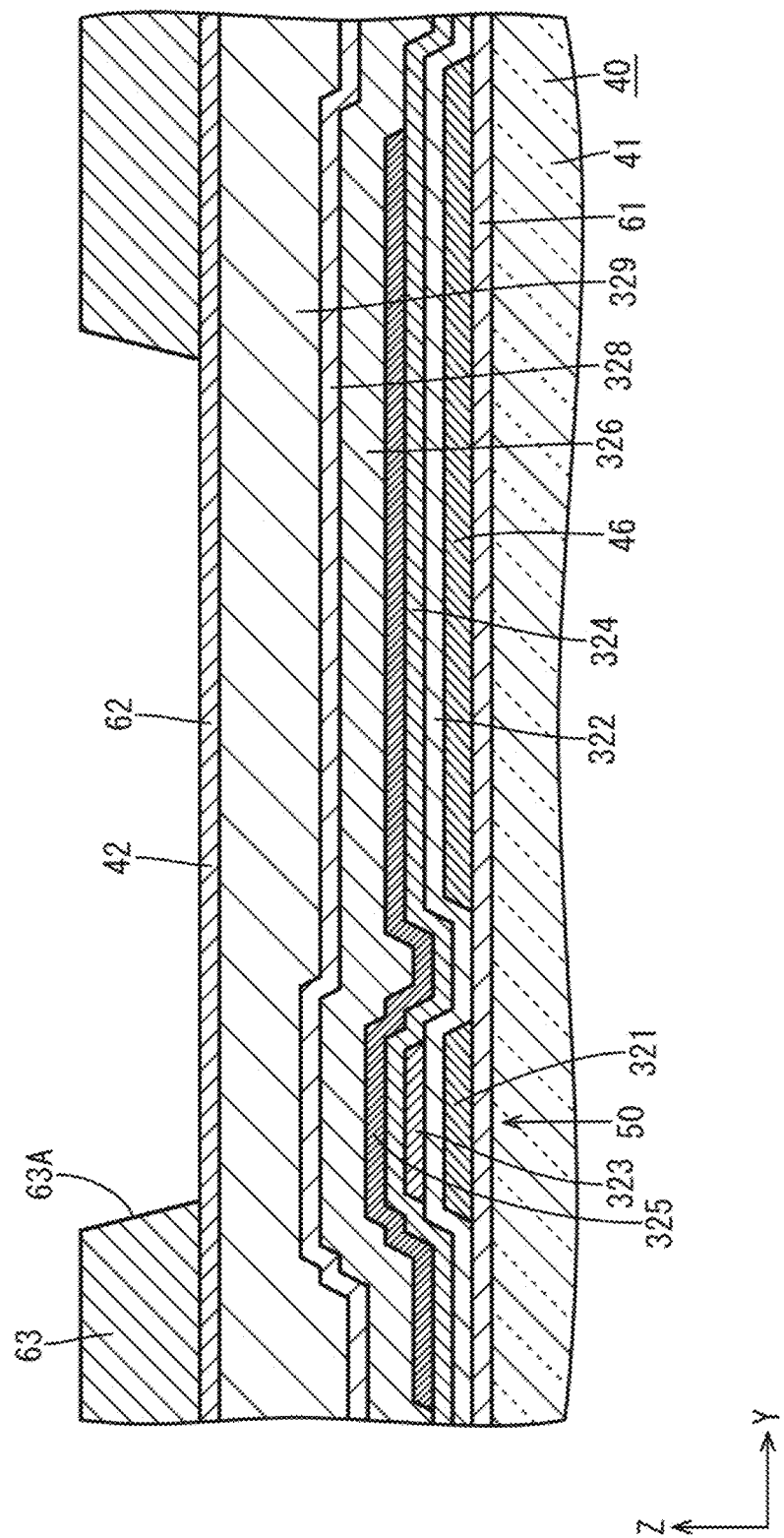
FIG. 15 is a cross-sectional view of the array substrate along line D-D in FIG. 13.

Next, films stacked on top of each other on the array substrate 41 will be described with reference to FIG. 15. FIG. 15 is a cross-sectional view of the array substrate 41. As illustrated in FIG. 15, the array substrate 41 includes a first metal film 321, a first insulator 322, a semiconductor film 323, a second insulator 324, a second metal film 325, a third insulator 326, a third metal film 327, a fourth insulator 328, and a fifth insulator 329. This configuration is similar to the configuration of the array substrate 10A (see FIG. 4) included in the liquid crystal panel 10 according to the first embodiment. The reference numeral of the third metal film 327 is provided in FIG. 13. The array substrate 41 according to this embodiment includes a basecoat film 61, a fourth metal film 62, and a protective layer 63. This configuration is different from the first embodiment. The basecoat film 61 is disposed in a layer lower than the first metal film 321. The fourth metal film 62 is disposed in a layer upper than the fifth insulator 329. The protective layer 63 is disposed in a layer upper than the fourth metal film 62. The fourth metal film 62 is a single-layer film made of one kind of metal material, a multi-layer film made of different kinds of metal materials, or an alloy to have conductivity and light blocking properties. The basecoat film 61 is made of an inorganic insulating material similar to the first insulator 322. The protective layer 63 is made of an organic insulating material such as polyimide. The protective layer 63 covers outer edge sections of the anode electrodes 42. The protective layer 63 includes holes 63A at positions overlapping center sections of the anode electrodes 42. The organic EL device layer is evaporated onto the anode electrodes 42 via the holes 63A.

Figure 16:
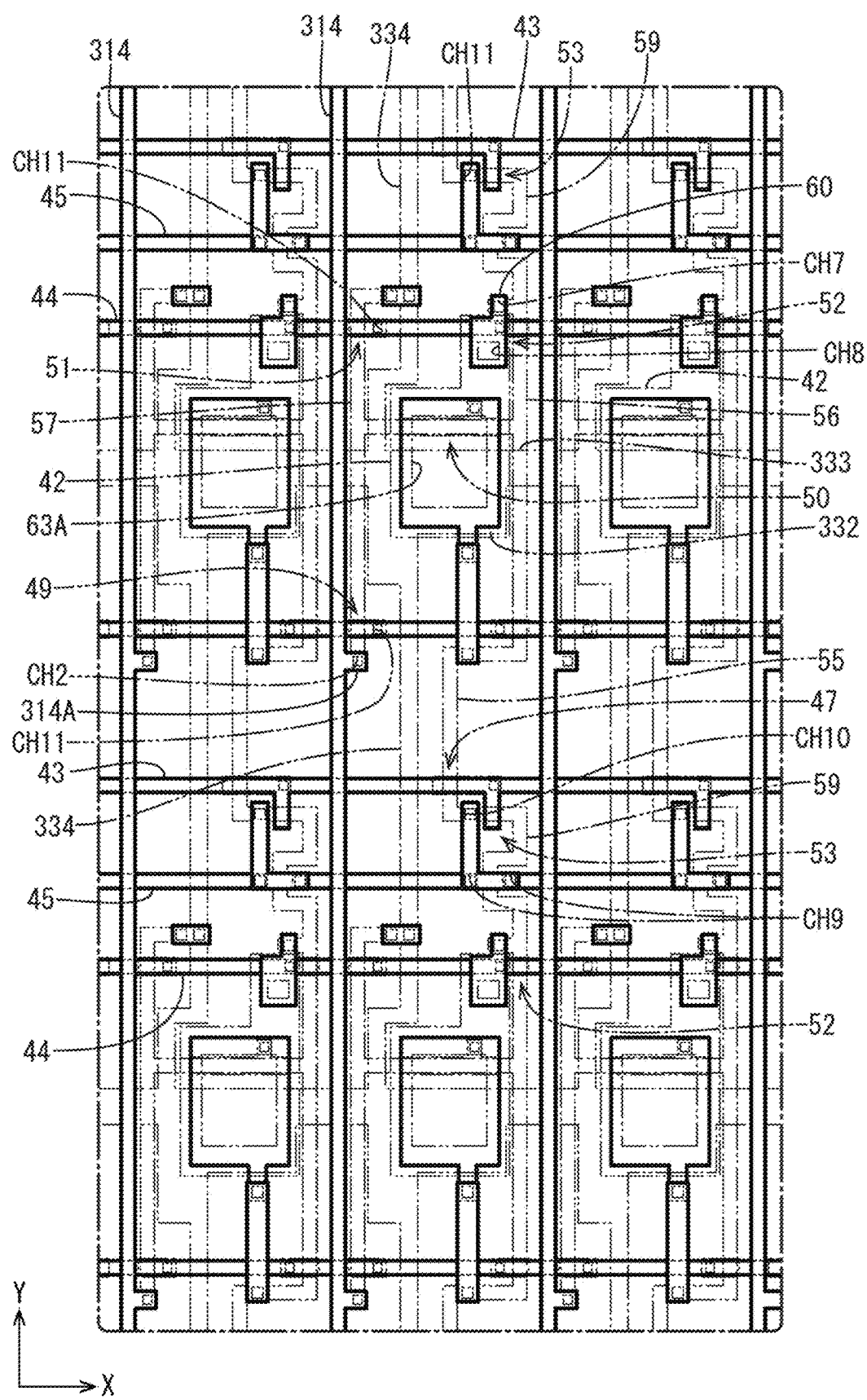
FIG. 16 is a plan view mainly illustrating patterns of a second metal film and a third metal film included in the array substrate.
Figure 17:
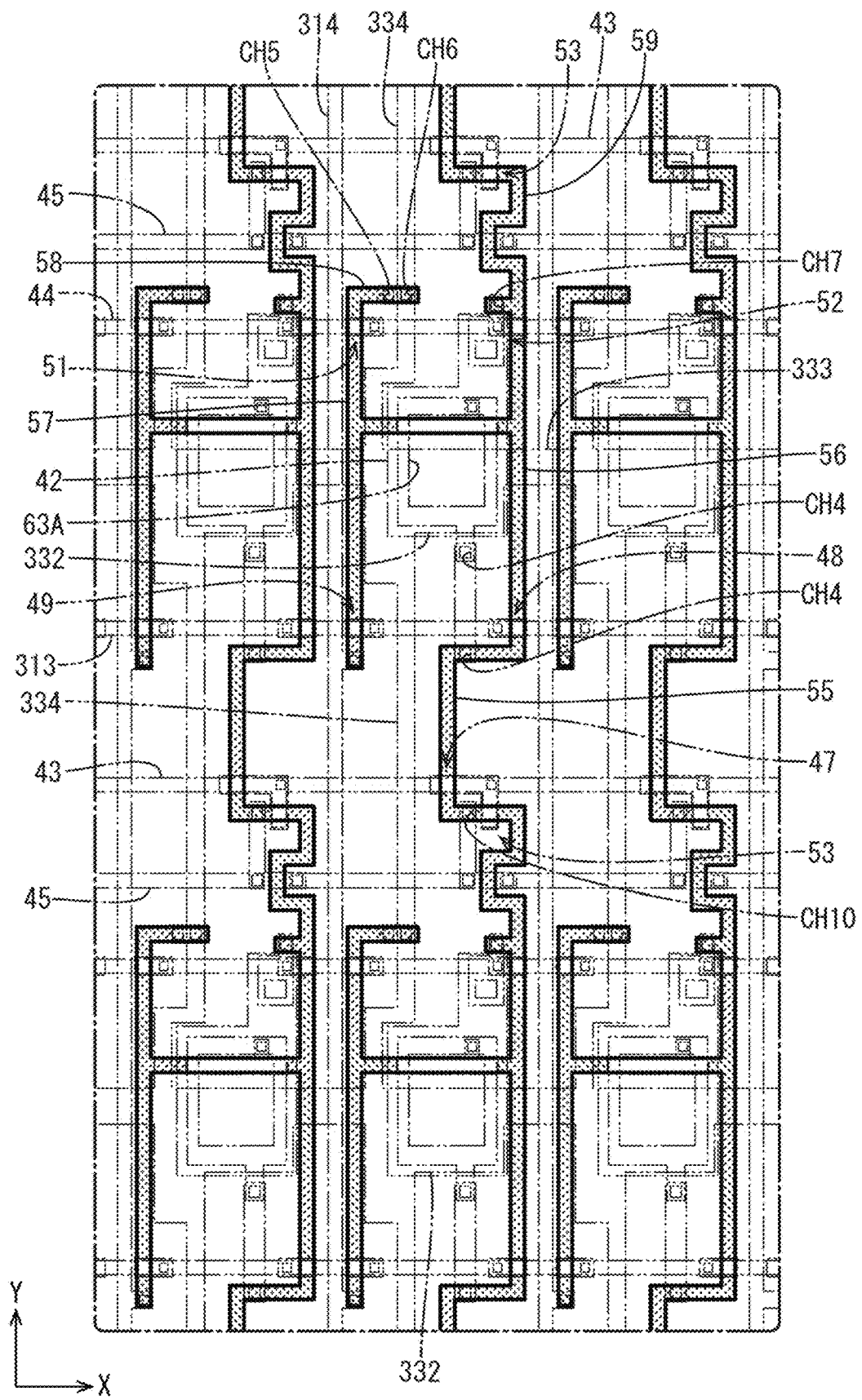
FIG. 17 is a plan view mainly illustrating a pattern of a semiconductor film included in the array substrate.
Figure 18:
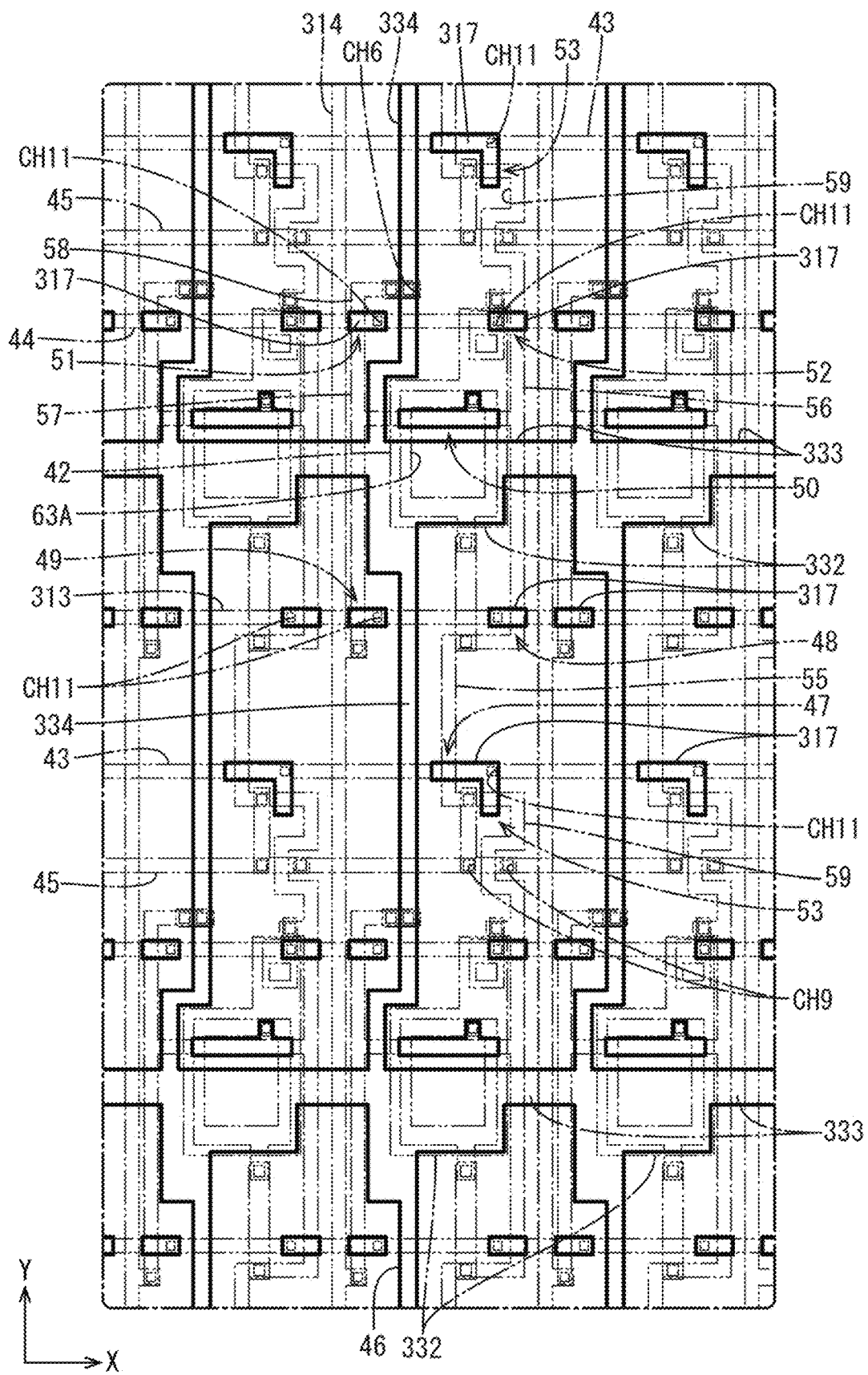
FIG. 18 is a plan view mainly illustrating a pattern of a first metal film included in an array substrate.

Next, what components of the array substrate 41 are prepared from the metal films 62, 321, 325 and 327 and the semiconductor film 323 will be described with reference to FIGS. 16 to 18. FIG. 16 is a plan view illustrating the second metal film 325 and the third metal film 327 by solid lines and other metal films 62, 321 and the semiconductor film 323 by long-dashed double-dotted lines. FIG. 17 is a plan view illustrating the semiconductor film 323 by solid lines and the metal films 62, 321, 325, 327 by long-dashed double-dotted lines. In FIG. 17, resistance reduced sections of the semiconductor film 323 are indicated by hatching and resistance non-reduced sections of the semiconductor film 323 are indicated in white. FIG. 18 is a plan view illustrating the first metal film 321 by solid lines and other metal films 62, 325, 327 and the semiconductor film 323 by long-dashed double-dotted lines. The gate line 313, the sub-gate lines 43, the EM line 44, and sections of the initialization power supply line 45 (sections except for an intersection between the initialization power supply line 45 and the sixth connecting line 59) illustrated in FIG. 16 are prepared from the second metal film 325 in this embodiment. Furthermore, the gate electrode of the fourth TFT 50 is prepared from the second metal film 325. The gate electrode of the fourth TFT 50 is smaller than the anode electrode 42 and two-dimensionally arranged to largely overlap the anode electrode 42. Sections of the gate line 313 are configured as the gate electrodes of the second TFT 48 and the third TFT 49. Sections of the sub-gate line 43 are configured as the gate electrodes of the first TFT 47 and the seventh TFT 53. Sections of the EM line 44 are configured as the gate electrodes of the fifth TFT 51 and the sixth TFT 52. The source line 314 is prepared from the third metal film 327. Furthermore, a section of the initialization power supply line 45 (an intersection between the initialization power supply line 45 and the sixth connecting line 59), a section of the second connecting line 55 (an intersection between the second connecting line 55 and the gate line 313), a section of the fifth connecting line 58 (a connecting section between the fifth connecting line 58 and the anode-side power supply line 46), and a section of the seventh connecting line 60 (an intersection between the seventh connecting line 60 and the EM line 44) are prepared from the third metal film 327. The section of the initialization power supply line 45 prepared from the second metal film 325 is connected to the section of the initialization power supply line 45 prepared from the third metal film 327 via an initialization power supply line contact hole CH9 drilled through the third insulator 326. Only the anode electrode 42 is prepared from the fourth metal film 62.

The source regions, the drain regions, and the channel regions of the TFTs 47 to 53 illustrated in FIG. 17 are prepared from the semiconductor film 323. Furthermore, large sections of the connecting lines 54 to 60 are prepared from the semiconductor film 323. Specifically, entire sections of the first connecting line 54, the third connecting line 56, the fourth connecting line 57, and the sixth connecting line 59 are the resistance reduced sections of the semiconductor film 323 not overlapping the first metal film 321. Sections of the second connecting line 55 except for a section at an intersection between the second connecting line 55 and the gate line 313 are the resistance reduced sections of the semiconductor film 323. The second connecting line 55 includes the section prepared from the third metal film 327 and the sections that are the resistance reduced sections of the semiconductor film 323. The sections are connected to each other via the second connecting line contact holes CH4 drilled through the third insulator 326. Sections of the fifth connecting line 58 except for a connecting section between the fifth connecting line 58 and the anode-side power supply line 46 prepared from the third metal film 327 are the resistance reduced sections of the semiconductor film 323. The sections of the fifth connecting line 58, which are the resistance reduced sections of the semiconductor film 323, are connected to the section of the fifth connecting line 58 prepared from the third metal film 327 via the fifth connecting line contact holes CH5 drilled through the third insulator 326. A section of the seventh connecting line 60 branching off from the sixth connecting line 59 is the resistance reduced section of the semiconductor film 323. The sections of the seventh connecting line 60, which are the resistance reduced section of the semiconductor film 323, are connected to other sections prepared from the third metal film 327 via seventh connecting line contact holes CH7 drilled through the third insulator 326. The section of the seventh connecting line 60 prepared from the third metal film 327 is connected to a section of the anode electrode 42 prepared from the fourth metal film 62 (a section of the seventh connecting line 60 projecting toward the sixth TFT 52 in the Y-axis direction) via anode electrode contact holes CH8 drilled through the fourth insulator 328 and the fifth insulator 329. The first connecting line 54 is connected to the section of the initialization power supply line 45 prepared from the third metal film 327 via a first connecting line contact hole CH10 drilled through the third insulator 326. The source region of the third TFT 49, which is the resistance reduced section of the semiconductor film 323, is connected to a source line branch 314A of the source line 314 prepared from the third metal film 327 via a source line contact hole CH2 drilled through the third insulator 326.

The light blocking portions 317 of the TFTs 47 to 53 and the anode-side power supply line 46 illustrated in FIG. 18 are prepared from the first metal film 321. The light blocking portions 317 of the TFTs 47 to 53 are connected to the gate line 313, the sub-gate lines 43, and sections of the EM line 44 and the initialization power supply lines 45 prepared from the second metal film 325 via the gate electrode contact holes CH11 drilled through the first insulator 322. The anode-side power supply lines 46 include capacitance forming portions 332 that overlap the anode electrodes 42 and the gate electrode of the fourth TFT 50. Each of the capacitance forming portions 332 is rectangular and smaller than the anode electrode 42 but larger than the gate electrode of the fourth TFT 50. A capacitor 64 (a holding capacitor) is provided between the capacitance forming portion 332 of the anode-side power supply line 46 and the gate electrode of the fourth TFT 50 (see FIG. 14). The anode-side power supply line 46 is connected to the section of the fifth connecting line 58 prepared from the third metal film 327 via the anode-side power supply line contact holes CH6 drilled through the first insulator 322 and the third insulator 326. The anode-side power supply lines 46 include first capacitance lines 333 and second capacitance lines 334 in addition to the capacitance forming portions 332. The first capacitance lines 333 extend in the X-axis direction. The first capacitance lines 333 are coupled to the capacitance forming portions 332 that are adjacent to the first capacitance lines 333 in the X-axis direction. The second capacitance lines 334 extend in the Y-axis direction. The second capacitance lines 334 are coupled to the capacitance forming portions 332 that are adjacent to the second capacitance lines 334 in the Y-axis direction. The capacitance forming portions 332 that are arranged in the X-axis direction and the Y-axis direction are connected to one another via the first capacitance lines 333 and the second capacitance lines 334 that are arranged in a grid along the X-axis direction and the Y-axis direction. According to the configuration, the standard deviation in distribution regarding resistances of the capacitance forming portions 332 can be further reduced. Therefore, the potential at the gate electrode of the fourth TFT 50 that forms the capacitance with the capacitance forming portion 332 is further stably held.

Operation of the organic EL display panel 40 having such a configuration will be described with reference to FIGS. 13 and 14. First, the EM line 44 related to the nth pixel PX receives an off signal. The fifth TFT 51 and the sixth TFT 52 related to the nth pixel PX turn off (are not driven). Next, scanning signals are supplied to the gate line 313 related to the (n−1)th pixel PX (scanned one before) and the sub-gate line 43 related to the nth pixel PX at the same timing. The first TFT 47 related to the nth pixel PX turns on and thus a current flows between the initialization power supply line 45 and the second connecting line 55. An initialization signal transmitted through the initialization power supply line 45 is transmitted through the source region, the channel region, and the drain region of the first TFT 47 and supplied to the gate electrode of the fourth TFT 50 via the second connecting line 55. A potential of the initialization signal is higher than a threshold voltage of the fourth TFT 50 and thus the fourth TFT 50 stays on. A current flows between the third connecting line 56 and the fourth connecting line 57. The sub-gate line 43 related to the nth pixel PX receives an off signal. The first TFT 47 related to the nth pixel PX turns off. Because the second TFT 48 is off, the initialization signal supplied to the second connecting line 55 is not supplied to the third connecting line 56. An image signal is supplied to the source line 314 related to the (n−1)th pixel PX and then a light emission control signal is supplied to the EM line 44 related to the (n−1)th pixel PX.

Next, scanning signals are supplied to the gate line 313 related to the nth pixel PX and the sub-gate line 43 related to the (n+1)th pixel PX (scanned one after) at the same timing. The second TFT 48 and the third TFT 49 related to the nth pixel PX and thus a current flows between the source line 314 and the fourth connecting line 57 and a current flows between the third connecting line 56 and the second connecting line 55. When an image signal is supplied to the source line 314 at this timing, the image signal is transmitted from the source line 314 to the fourth connecting line 57. The fourth TFT 50 turn on based on the initialization signal supplied to the gate electrode. The potential at the gate electrode is held with the capacitor 64 between the fourth TFT 50 and the anode-side power supply line 46. The image signal transmitted through the fourth connecting line 57 is supplied to the third connecting line 56 through the source region, the channel region, and the drain region of the fourth TFT 50. The image signal transmitted through the third connecting line 56 is supplied to the second connecting line 55 through the source region, the channel region, and the drain region of the second TFT 48. The image signal transmitted through the second connecting line 55 is supplied to the gate electrode of the fourth TFT 50. The gate electrode of the fourth TFT 50 is held at the potential related to the image signal with the capacitor 64. Then, the gate line 313 related to the nth pixel PX receives an off signal. With the scanning signal supplied to the sub-gate line 43 related to the (n+1)th pixel PX, the seventh TFT 53 related to the nth pixel PX turn on. Therefore, a current flows between the sixth connecting line 59 and the initialization power supply line 45 and a current flows between the seventh connecting line 60 and the initialization power supply line 45. The anode electrode 42 related to the nth pixel PX is at a potential related to the initialization signal.

Then, a light emission control signal is supplied to the EM line 44 related to the nth pixel PX. The potential of the light emission control signal is higher than the threshold voltages of the fifth TFT 51 and the sixth TFT 52. Therefore, the fifth TFT 51 and the sixth TFT 52 turn on. In this condition, a current flows between the fourth connecting line 57 and the fifth connecting line 58, a current flows between the third connecting line 56 and the sixth connecting line 59, and a current flows between the third connecting line 56 and the seventh connecting line 60. Because the fifth connecting line 58 is connected to the anode-side power supply line 46, a power supply signal transmitted through the anode-side power supply line 46 is supplied from the fifth connecting line 58 to the fourth connecting line 57 via the source region, the channel region, and the drain region of the fifth TFT 51. A power supply signal transmitted through the fourth connecting line 57 is supplied to the third connecting line 56 via the source region, the channel region, and the drain region of the fourth TFT 50. The power supply signal supplied to the third connecting line 56 is at a potential equal to the potential at the gate electrode of the fourth TFT 50, that is, a potential based on the image signal supplied to the source line 314. The power supply signal with the potential adjusted based on the image signal supplied from the third connecting line 56 to the source line 314 is supplied to the sixth connecting line 59 and the seventh connecting line 60 through the source region, the channel region, and the drain region of the sixth TFT 52 and then supplied to the anode electrode 42. The anode electrode 42 is at the potential based on the image signal supplied to the source line 314. Therefore, the light emitting layer of the organic EL device layer connected to the anode electrode 42 emits light in an amount corresponding to the potential. When the EM line 44 related to the nth pixel PX receives an off signal, the fifth TFT 51 and the sixth TFT 52 turn off and the emission of light by the light emitting layer of the organic EL device layer stops. A period of light emission by the light emitting layer is from the reception of the light emission control signal by the EM line 44 related to the nth pixel PX to the reception of the off signal. By adjusting the timing of the reception of the light emission control signal and the off signal by the EM line 44, a light emission period and a light non-emission period regarding the light emitting layer can be controlled.

Other Embodiments

The technology described herein is not limited to the embodiments described above and illustrated by the drawings. For example, the following embodiments will be included in the technical scope of the technology described herein.

(1) In each of the above embodiments, each of the capacitance lines linearly extends in the X-axis direction or the Y-axis direction. However, at least one of each first capacitance line and each second capacitance line may bend. If appropriate, at least one of each first capacitance line and each second capacitance line may be in zigzags.

(2) In each of the above embodiments, the top gate type TFTs including the light blocking portions separately from the gate electrodes are used. However, the top gate type TFTs may have configurations not including the light blocking portions separately from the gate electrodes. In such a configuration, the source lines may be prepared from the first metal film and the capacitance forming portions, the first capacitance lines, and the second capacitance lines may be prepared from the third metal film.

(3) In each of the above embodiments, the top gate type TFTs including the gate electrodes disposed in the upper layer to overlap the channel regions are used. However, bottom gate type TFTs including gate electrodes disposed in a lower layer to overlap the channel regions may be used.

(4) In each of the first to the third embodiments, the light blocking portions of the TFTs do not contact the gate electrodes. Similar to each of the TFTs in the fourth embodiment, the light blocking portion may be connected to the gate electrode and configured as a double-gate TFT.

(5) In each of the first to the third embodiments, each of the resistance reduced sections has the cross shape similar to that of the capacitance forming portion in a plan view. However, a plan-view shape of the resistance reduced section may be different from the plan-view shape of the capacitance forming portion. Because the resistance reduced section is prepared from the semiconductor film and has the light transmissivity, the aperture ratio of the pixels is less likely to be reduced even if the area of the resistance reduced sections is larger than the area of the capacitance forming portions.

(6) In each of the first to the third embodiments, each of the electrodes includes four domains. However, each of the electrodes may include more than four domains. In such a configuration, a plan-view shape of borders of the domains is different. Therefore, the plan-view shape of the capacitance forming portion or the resistance reduced portions may be altered from the cross shape.

(7) In each of the first to the third embodiments, the drain region of each of the TFT and the corresponding pixel electrode are indirectly connected to each other via the drain connecting portion. However, the drain connecting portion may be omitted, that is, the drain region and the pixel electrode may be directly connected to each other.

(8) In each of the first to the third embodiments, in the liquid crystal panel, the number of the gate lines is double of the number of the pixel electrodes in the Y-axis direction and the number of the source lines is a half of the number of the pixel electrodes in the X-axis direction. However, the number of the gate lines may be equal to the number of the pixel electrodes in the Y-axis direction and the number of the source lines may be equal to the number of the pixel electrodes in the X-axis direction.

(9) In each of the first to the third embodiments, the liquid crystal material included in the liquid crystal layer is the negative liquid crystal material having the negative dielectric constant anisotropy. However, a positive liquid crystal material having positive dielectric constant anisotropy may be used.

(10) In each of the first to the third embodiments, the vertical alignment films are used. However, horizontal alignment films may be used.

(11) The two-dimensional arrangement of the TFTs may be altered from those in each of the first to the third embodiments.

(12) In each of the first to the third embodiments, the line width of each of the gate lines alters at points. However, the line width may be substantially constant.

(13) The liquid crystal panel may be configured to operate in TN display mode, FFS display mode, or IPS display mode other than the display mode in the first to the third embodiment.

(14) In each of the first to the third embodiments, the liquid crystal display device including the transmissive-type liquid crystal panel is provided as an example. However, a liquid crystal display device including a reflective-type liquid crystal panel or a semitransmissive-type liquid crystal panel may be used.

(15) In the fourth embodiment, the top emission-type organic EL display panel is provided as an example. However, a bottom emission-type organic display panel configured to output light emitted in a light emitting layer toward the array substrate may be used.

(16) The circuit for supplying signals to the anode electrodes may be configured different from that of the fourth embodiment. For example, the number of the TFTs is not limited to seven. The plan-view shapes (routing patterns) of the anode-side power supply lines, the anode electrodes, and the connecting lines may be altered where appropriate. The arrangement sequence and the two-dimensional shapes of the gate lines, the sub-gate lines, the EM lines, and the initialization power supply lines may be altered where appropriate. What metal films are selected to prepare the sub-gate lines, the EM lines, the initialization power supply lines, and the anode-side power supply lines may be altered where appropriate. What metal films or semiconductor film to be used to configure resistance reduced sections as the connecting lines may be altered where appropriate.

(17) In each of the above embodiments, the semiconductor film made of the oxide semiconductor is provided. However, the semiconductor film may be made of amorphous silicon or polysilicon (LIPS).

(18) In each of the above embodiments, the array substrate included in the liquid crystal panel or in the organic EL display panel is provided as an example. However, array substrates included in other types of display panels (e.g., microcapsule electrophoretic display (EPD) panels) may be provided.

The invention claimed is:

1. An array substrate comprising:
a first electrode and a second electrode arranged in a first direction;
a first capacitance forming portion and a second capacitance forming portion arranged in the first direction and being opposed to a back surface of the first electrode and a back surface of the second electrode, respectively, the first capacitance forming portion and the second capacitance forming portion being made from a conductive film;
at least one insulator between the first electrode and the first capacitance forming portion and between the second electrode and the second capacitance forming portion;
a first capacitance line extending in the first direction from an edge of the first capacitance forming portion opposite the second capacitance forming portion to an edge of the second capacitance forming portion opposite the first capacitance forming portion, the first capacitance line being made from the conductive film; and
a second capacitance line on an opposite side of the second capacitance forming portion from the first capacitance line and extending in a second direction that is perpendicular to the first direction, the second capacitance line being coupled to the second capacitance forming portion, the second capacitance line being made from the conductive film.

2. The array substrate according to claim 1, further comprising:
two first lines extending in the first direction and crossing the second capacitance line, the first lines sandwich the first electrode and the second electrode in the second direction; and
at least one second line between the first electrode and the second electrode, the at least one second line extending in the second direction and crossing the first capacitance line, wherein
the conductive film from which the first capacitance forming portion, the second capacitance forming portion, the first capacitance line, and the second capacitance line are made is a first conductive film,
the first lines are made from a second conductive film, and
the at least one second line is made from a third conductive film.

3. The array substrate according to claim 2, further comprising:
a first switching component including:
a first gate electrode connected to one of the first lines;
a first source region connected to the at least one second line;

a first channel region including a first end connected to the first source region, and being opposed to a back surface of the first gate electrode; and
a first drain region connected to a second end of the first channel region;
a second switching component including:
a second gate electrode connected to one of the first lines;
a second source region connected to the at least one second line;
a second channel region including a first end connected to the second source region and being opposed to a back surface of the second gate electrode; and
a second drain region connected to a second end of the first channel region;
a first light blocking portion opposed to a back surface of the channel region;
a second light blocking portion opposed to a back surface of the second channel region, wherein
the first source region, the second source region, the first channel region, the second channel region, the first drain region, and the second drain region are made from a semiconductor film, and
the first light blocking portion and the second light blocking portion are made from the first conductive film.

4. The array substrate according to claim 3, wherein the first drain region is opposed to the back surface of the first electrode and connected to the first electrode, and
the second drain region is opposed to the back surface of the second electrode and connected to the second electrode.

5. The array substrate according to claim 4, further comprising a first resistance reduced portion and a second resistance reduced portion made from the semiconductor film and having reduced resistances, wherein
the first resistance reduced portion is connected to the first drain region and opposed to a front surface of the first the capacitance forming portion, and
the second resistance reduced portion is connected to the second drain region and opposed to a front surface of the second capacitance forming portion.

6. The array substrate according to claim 5, wherein the at least one insulator includes:
a first insulator including a portion between one of the first lines and the second capacitance line, a portion between another one of the first lines and the second capacitance line, a portion between the first light blocking portion and the first channel region, a portion between the second light blocking portion and the second channel region, a portion between the first resistance reduced portion and the first capacitance forming portion, and a portion between the second resistance reduced portion and the second capacitance forming portion; and
a second insulator including a portion between the first gate electrode and the first channel region and a portion between the second gate electrode and the second channel region.

7. The array substrate according to claim 6, further comprising:
a third electrode adjacent to the second electrode in the first direction;
a third capacitance forming portion adjacent to the second capacitance forming portion and opposed to a back surface of the third electrode, the third capacitance forming portion being made from the conductive film;
the at least one second line includes second lines sandwiching the second electrode and the third electrode in the first direction; and
a third switching component including:
a third gate electrode connected to the one of the first lines;
a third source region connected to another one of the at least one second line;
a third drain region connected to the third electrode; and
a third channel region including a first end connected to the third source region and a second end connected to the third drain region, the third channel region being opposed to a back surface of the third gate electrode and made from the semiconductor film, wherein
the second insulator further includes a portion between the third gate electrode and the third channel region.

8. The array substrate according to claim 7, further comprising:
a first drain connecting portion between the first electrode and the first drain region;
a second drain connecting portion between the second electrode and the second drain region;
a third drain connecting portion between the third electrode and the third drain region;
a third insulator including:
a portion between the first drain connecting portion and the first drain region and including a contact hole through which the first drain connecting portion is coupled to the first drain region;
a portion between the second drain connecting portion and the second drain region and including a contact hole through which the second drain connecting portion is couple to the second drain region; and
a portion between the third drain connecting portion and the third drain region and including a contact hole through which the third drain connecting portion is coupled to the third drain region;
a fourth insulator including:
a portion between the first electrode and the first drain connecting portion and including a contact hole through which the first electrode is coupled to the first drain connecting portion;
a portion between the second electrode and the second drain connecting portion including a contact hole through which the second electrode is coupled to the second drain connecting portion; and
a potion between the third electrode and the third drain connecting portion and including a contact hole through which the third electrode is coupled to the third drain connecting portion; and
a fifth insulator including:
a portion between the first electrode and the first drain connecting portion including a contact hole through which the first electrode is coupled to the first drain connecting portion;
a portion between the second electrode and the second drain connecting portion and including a contact hole through which the second electrode is coupled to the second drain connecting portion; and
a portion between the third electrode and the third drain connecting portion and including a contact hole through which the third electrode is coupled to the third drain connecting portion.

9. The array substrate according to claim 6, further comprising:
a fourth capacitance forming portion including a front surface opposed to the back surface of the first electrode and a back surface opposed to a front surface of the first capacitance forming portion;
a fifth capacitance forming portion including a front surface opposed to the back surface of the second electrode and a back surface opposed to a front surface of the second capacitance forming portion;
a sixth capacitance forming portion including a front surface opposed to the back surface of the third electrode and a back surface opposed to a front surface of the third capacitance forming portion; and
a connecting portion made from the third conductive film and coupled to the fifth capacitance forming portion and the sixth capacitance forming portion, wherein
the fourth capacitance forming portion, the fifth capacitance forming portion, and the sixth capacitance forming portion are made from the third conductive film,
the connecting portion crosses the second capacitance line,
the first insulator includes a portion between the connecting portion and the second capacitance line and including a contact hole through which the connecting portion is coupled to the second capacitance line, and
the third insulator includes a portion between the connecting portion and the second capacitance line and including a contact hole through which the connecting portion is coupled to the second capacitance line.

10. The array substrate according to claim 2, further comprising:
a third electrode adjacent to the second electrode in the first direction;
a third capacitance forming portion adjacent to the second capacitance forming portion in the first direction and opposed to a back surface of the third electrode, the third capacitance forming portion being made from the first conductive film;
the at least one second line including second lines sandwiching the second electrode and the third electrode in the first direction;
a first switching component including:
a first gate electrodes connected to one of the first lines;
a first source region connected to one of the at least one second line;
a first drain region connected to the first electrode; and
a first channel region including a first end connected to the first source region and a second end connected to the first drain region, the first channel region being opposed to a back surface of the first gate electrode and made from a semiconductor film;
a second switching component including:
a second gate electrode connected to another one of the first lines;
a second source region connected to the one of the at least one second line;
a second drain region connected to the second electrode; and
a second channel region including a first end connected to the second source region and a second end connected to the second drain region, the second channel region being opposed to a back surface of the second gate electrode and made from the semiconductor film; and a third switching component including:
a third gate electrode connected to the one of the first lines;
a third source region connected to another one of the at least one second line;
a third drain region connected to the third electrode; and
a third channel region including a first end connected to the third source region and a second end connected to the third drain region, the third channel region being opposed to a back surface of the third gate electrode and made from the semiconductor film.

11. The array substrate according to claim 10, wherein
each of the first electrode, the second electrode, and the third electrode includes domains, and
each of the first capacitance forming portion, the second capacitance forming portion, and the third capacitance forming portion is opposed to borders between the domains of a corresponding one of the first electrode, the second electrode, and the third electrode.

12. The array substrate according to claim 11, wherein
the domains of each of the first electrode, the second electrode, and the third electrode are arranged in the first direction and the second direction,
each of the first capacitance forming portion, the second capacitance forming portion, and the third capacitance forming portion includes:
a first capacitance forming section opposed to one of the borders between the domains adjacent to each other in the second direction; and
a second capacitance forming section opposed to another one of the borders between the domains adjacent to each other in the first direction, and
the first capacitance forming section of the first capacitance forming portion, the first capacitance line, and the first capacitance forming section of the second capacitance forming portion are coupled to each other to define a straight line.

13. The array substrate according to claim 10, further comprising:
a fourth capacitance forming portions portion including a front surface opposed to the back surface of the first electrode and a back surface opposed to a front surface of the first capacitance forming portion;
a fifth capacitance forming portion including a front surface opposed to the back surface of the second electrode and a back surface opposed to a front surface of the second capacitance forming portion; and
a sixth capacitance forming portion including a front surface opposed to the back surface of the third electrode and a back surface opposed to a front surface of the third capacitance forming portion, wherein
the fourth capacitance forming portion, the fifth capacitance forming portion, and the sixth capacitance forming portion are made from the third conductive film.

14. The array substrate according to claim 13, further comprising a connecting portion made from the third conductive film, the connection portion being coupled to the fifth capacitance forming portion and the sixth capacitance forming portion.

15. The array substrate according to claim 14, wherein
the connecting portion crosses the second capacitance line,
the connection portion is connected to the second capacitance line via a contact hole in the at least one insulator between the connecting portion and the second capacitance line.

16. The array substrate according to claim 13, wherein each of the first electrode, the second electrode, and the third electrode includes domains, and
- each of the fourth capacitance forming portion, the fifth capacitance forming portion, and the sixth capacitance forming portion is opposed to borders between the adjacent domains of a corresponding one of the first electrode, the second electrode, and the third electrode.

17. A display device comprising:
the array substrate according to claim 1; and
an opposed substrate opposed to the array substrate.

* * * * *